United States Patent [19]

Watson

[11] Patent Number: 5,034,814
[45] Date of Patent: Jul. 23, 1991

[54] SYSTEM FOR REDUCING NTSC FLICKER IN COMPATIBLE HIGH DEFINITION TELEVISION SYSTEMS

[75] Inventor: John N. Watson, Moorestown, N.J.

[73] Assignee: Westinghouse Electric Corp., Pittsburgh, Pa.

[21] Appl. No.: 317,502

[22] Filed: Mar. 1, 1989

Related U.S. Application Data

[63] Continuation-in-part of Ser. No. 220,704, Jul. 13, 1988, abandoned.

[51] Int. Cl.$^5$ .............................................. H04N 7/04
[52] U.S. Cl. ...................................... 358/141; 358/138
[58] Field of Search .................... 358/11, 12, 15, 141, 358/138, 148, 150

[56] References Cited

U.S. PATENT DOCUMENTS

| | | | |
|---|---|---|---|
| 2,892,015 | 6/1959 | Jones | 358/15 |
| 3,617,626 | 11/1971 | Bluth | 358/11 |
| 4,521,803 | 6/1985 | Gittinger | 358/12 |

FOREIGN PATENT DOCUMENTS

0274993 11/1987 Japan.
0002974 4/1988 PCT Int'l Appl..

OTHER PUBLICATIONS

IEEE Transactions on Broadcasting, vol. 34, No. 3, Sep. 1988, "High Definition and High Frame Rate Compatible N.T.S.C. Broadcast Television System", by G. William Meeker, pp. 313–322.
IEEE Transactions on Broadcasting, vol. BC-33, No. 4, Dec. 1987, "High Definition NTSC Broadcast Protocol", by Richard J. Iredale, pp. 161–169.
IEEE Transactions on Broadcasting, vol. BC-33, No. 4, Dec. 1987, "An HDTV Broadcasting System Utilizing a Bandwidth Compression Technique-MUSE", by Yuichi Ninomiya et al., pp. 130–160.
Dill, F. H., "High Resolution NTSC Television System", IBM Technical Disclosure, vol. 21, No. 5, 10/78.

Primary Examiner—James J. Groody
Assistant Examiner—David E. Harvey
Attorney, Agent, or Firm—M. P. Lynch

[57] ABSTRACT

A system for converting a high definition video signal corresponding to a high definition picture, into a subsampled video signal compatible with NTSC transmission includes a circuit for performing N-phase subsampling on the high definition video signal to produce N sets of subsamples. Each of the subsamples corresponds to a different geographic position in the high definition picture. The N sets of subsamples are processed during N NTSC video frames, respectively, and the N NTSC video frames form an NTSC picture corresponding to the high definition picture. Each of the N sets of subsamples are processed to map each subsample into a geographic position within the NTSC picture, which corresponds to the geographic position in the high definition picture. By outputting the NTSC samples in a manner which preserves, in the NTSC signal, the relative frame-to-frame geometric offsets used in the sampling process, NTSC flicker on conventional NTSC receivers is minimized. Circuitry for reconstructing the high definition video signal from the subsampled signals allows an advanced or high definition receiver to receive the high definition video signal. Circuitry is also provided to increase the interlacing on standard NTSC receivers.

14 Claims, 18 Drawing Sheets

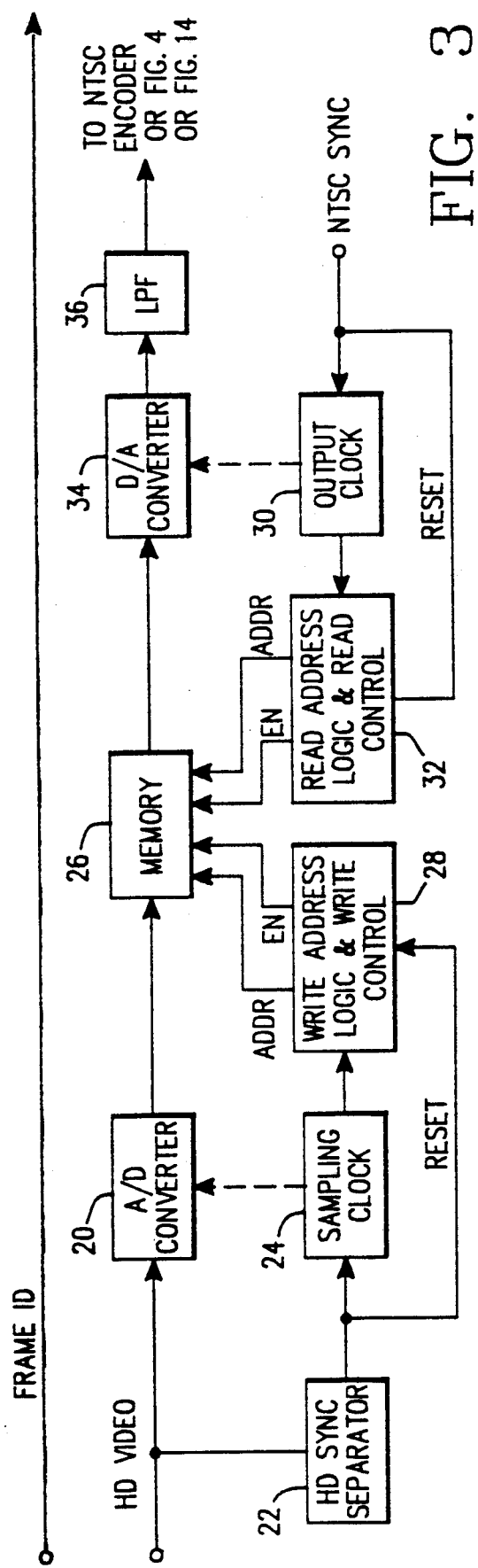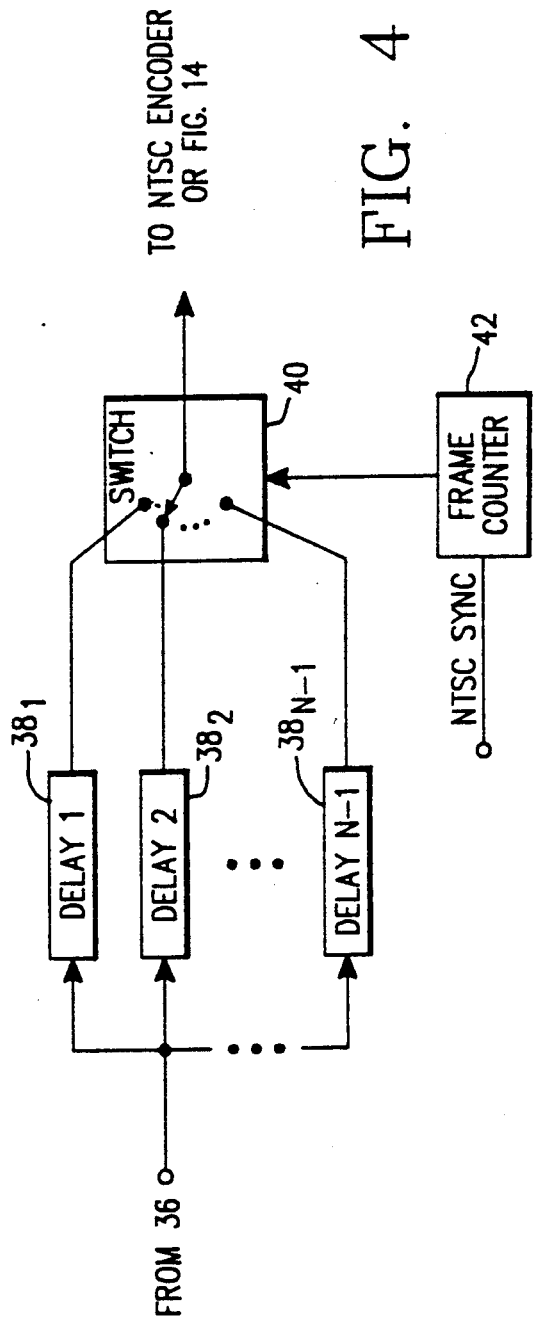

SYSTEM FOR REDUCING NTSC FLICKER IN COMPATIBLE HIGH DEFINITION TELEVISION SYSTEMS

CROSS-REFERENCE TO RELATED APPLICATION

This application is a continuation-in-part of U.S. application Ser. No. 220,704, filed July 13, 1988, now abandoned.

BACKGROUND OF THE INVENTION

This application is directed to high definition television (HDTV) and particularly to an improvement in high definition television which is compatible with standard NTSC (National Television System Committee) television.

There is a growing interest in the broadcasting field in high definition television because of its ability to deliver a video signal which produces improved resolution compared to standard NTSC television which has been in use for years. In general, in high definition television, more picture elements are displayed on a screen.

In the NTSC system, vertical resolution is limited by the number of scan lines. In standard NTSC television there are 525 scan lines, 483 of which typically contain active video. Thus, along the vertical axis, information must be displayed at discrete sites. In contrast, horizontal resolution is limited by bandwidth. Pixels may be positioned anywhere continuously along the horizontal axis, so that horizontal resolution is only a measure of how close two resolvable pixels on the same line can be positioned with respect to each other. For the 4.2 MHz luminance bandwidth specified for the NTSC system, 440 lines are achievable for the full screen width.

As described in "High Definition NTSC Broadcast Protocol", IEEE TRANSACTIONS ON BROADCASTING, Vol. BC-33, No. 4, pages 161-169, December 1987, by Richard J. Iredale, the contents of which are hereby incorporated by reference, there have been a number of different types of systems proposed for high definition television. For example, the system described in "An HDTV Broadcasting System" Utilizing a Bandwidth Compression Technique-MUSE, IEEE TRANSACTIONS ON BROADCASTING, Vol. BC-33, No. 4, December 1987, pages 130-160, by Ninomiya et al. involves a direct broadcast satellite having a satellite channel with a bandwidth of 27 or 24 MHz. While the quality of the picture delivered by this system is apparently very good, as explained in the Iredale publication, such a system is incompatible with the numerous NTSC home television receivers currently in use. That is, use of a system such as that described in the Ninomiya et al. publication would render existing home television receivers incapable of receiving the high definition television broadcast.

In view of the large number of NTSC home television receivers currently in use, it has been proposed that a high definition broadcast system should be compatible with NTSC video, so that NTSC home television receivers will be able to receive programming transmitted by a high definition television broadcast system.

The Iredale publication discloses an NTSC-related multiple subsampling technique for transmitting high definition pictures in a conventional NTSC channel while maintaining compatibility with existing NTSC television receivers. Subsampling is performed by using a sample and hold circuit to sample a video signal and produce a sample and hold waveform. If the video signal has been sampled at the Nyquist rate or higher, then the sample and hold waveform can be passed through a low pass filter to reconstruct the original waveform. Subsampling has been used in high definition television to achieve increased spatial resolution at the expense of temporal resolution. Thus, while standard NTSC television produces approximately 30 frames per second on the screen, a subsampled high definition television system will produce a lower number of frames per second but with a greater number of pixels in the picture. This can be a problem if an object in the picture is moving, and may make it necessary to reduce the spatial resolution of moving objects in the high definition picture in order to adequately display motion. However, the greater spatial resolution of a non-moving picture through use of an HDTV system is clear.

Of the NTSC compatible high definition television systems which have been proposed to date, images viewed on an NTSC receiver have been subject to scene dependent flicker. This flicker results from frame-to-frame differences in the NTSC signal caused by the interleaved nature of the subsampling. The effect is greatest near edges and in other high detail areas of the picture. The cause for such flicker is explained with reference to FIG. 1 which is a diagram showing the mapping of a high definition television picture in which plural subpixels a, b and c are mapped onto a single pixel in the NTSC picture. The subsampling employed in the high definition television picture illustrated by FIG. 1 is directed to horizontal subsampling to achieve horizontal resolution which is a multiple of the NTSC resolution. In NTSC frame 1, subpixel a from position $L_1$ in the HDTV picture is mapped onto pixel x which is at location $L_1'$ in the NTSC picture. In successive NTSC frames, subpixels b and c are also mapped onto pixel x at position $L_1'$ of the NTSC picture. Thus, in successive frames, the three spaced apart subpixels a, b and c from the HDTV picture are mapped onto a single geographic location $L_1'$ in the NTSC picture. Flicker is produced because of the difference in brightness values in the subpixels a, b and c which are scanned onto the same position in the picture. Since use of the above-described high definition video signal will degrade the picture on an NTSC receiver by producing this flicker which is not present when a standard NTSC video signal is employed, there is a desire to utilize techniques to minimize this flicker effect in the interest of compatibility.

It should be noted that it has also been suggested to perform vertical subsampling in order to double the scanning lines in the HDTV picture.

If alternate adjacent scan lines from the HDTV picture are used in alternate frames of the NTSC picture, vertically adjacent pixels will be mapped into a common location on the NTSC screen in a manner which is analogous to the horizontal subsampling arrangement described above with respect to FIG. 1. As a result, vertical subsampling will also produce flicker, and particularly edge flicker.

There is a need in the art for a system for converting a high definition video signal into a subsampled video signal compatible with NTSC transmission. Further, there is a need for such a system which is capable of being used for vertical and horizontal subsampling. There is a further need in the art for a circuit which can be provided in an advanced or high definition receiver to reconstruct the high definition video signal based on the subsampled video signal which is compatible with NTSC transmission.

SUMMARY OF THE INvENTION

It is an object of the present invention to overcome the deficiencies of prior art high definition television broadcast systems.

In particular, it is an object of the present invention to provide a system for minimizing flicker in NTSC receivers caused by horizontal subsampling and/or flicker caused by vertical subsampling.

It is a further object of the present invention to provide a method for converting a high definition video signal corresponding to a high definition picture into a subsampled video signal compatible with NTSC transmission, and a system for performing same.

It is a still further object of the present invention to provide a circuit for reconstructing a high definition video signal which has been converted into a subsampled video signal compatible with NTSC transmission.

In accordance with the method of the present invention, a high definition video signal corresponding to a high definition picture is converted into a subsampled video signal compatible with NTSC transmission. The method includes performing N-phase subsampling on the high definition video signal to produce N sets of subsamples, wherein each of the subsamples corresponds to a different geographic position in the high definition picture and where N is an integer greater than 1. The N sets of subsamples are processed during N NTSC video frames, respectively, and each of the N sets of subsamples is processed so as to map each subsample into a geographic position within the NTSC picture corresponding to its geographic position in the high definition picture. In one embodiment, the N sets of subsamples are first stored and then read out at NTSC scanning rates, with the read out starting time of each set of subsamples being offset from the previous set of subsamples by a predetermined amount.

The system of the present invention includes means for performing N-phase subsampling on the high definition video signal to produce N sets of subsamples, wherein each of the subsamples corresponds to a different geographic position in the high definition picture. The system of the present invention further includes means for processing the N sets of subsamples during N NTSC video frames, respectively, wherein each of the N sets of subsamples is processed so as to map each subsample into a geographic position within the NTSC picture corresponding to its geographic position in the high definition picture.

The method and system of the present invention minimizes flicker in the NTSC picture by maintaining the subsampling points in the same geometry or relative geographic positions in the NTSC frames as for the corresponding high definition television frames. For example, referring to FIG. 1, in accordance with the present invention, sampling points b and c will not be mapped onto pixel x at location $L_1'$ of the NTSC TV picture; instead, in accordance with the present invention, sampling points b and c will be mapped onto geographic positions on the NTSC TV picture which correspond to their positions in the high definition television picture (i.e., between locations $L_1'$ and $L_4'$). This minimizes flicker which is produced as a result of a continuously varying change in the high definition video signal. Thus, the inter-frame flicker artifact seen on conventional NTSC receivers when displaying a compatible high definition television signal employing multi-frame subsampling will be least when the system for encoding the high definition television signal is designed to output the NTSC samples in a manner which preserves in the NTSC signal, the relative frame-to-frame geometric offsets used in the sampling process.

The present invention also minimizes flicker which is produced in the NTSC picture as a result of vertical subsampling. In accordance with the present invention, lines from the high definition television picture are combined to form corresponding lines in the NTSC picture in order to reduce the flicker effects caused by the presence of a vertical gradient and shading.

The present invention also minimizes flicker, such as edge flicker, which is produced in the NTSC picture as a result of vertical or horizontal subsampling. In accordance with the present invention, NTSC frames which correspond to the HDTV frame are combined so that differences between the frames are made smaller, thereby reducing edge flicker. It should be noted that in reducing edge flicker, the signal-to-noise ratio is compromised. Thus, in accordance with the present invention, the sampling values for the NTSC frames are combined in a manner to minimize that flicker while achieving an acceptable signal-to-noise ratio.

The present invention is also directed to a circuit for generating an NTSC sync signal for producing N:1 interlacing, where N is an integer greater than 2. The circuit includes a means for providing a signal corresponding to the horizontal sync signal and a means for receiving a signal representative of the number of vertical fields. A plurality of delay lines are coupled to receive the signal corresponding to the horizontal sync signal, and a switch is coupled to the plurality of delay lines for selectively connecting to one of the plurality of delay lines to provide a delay signal corresponding to the horizontal sync signal. The means for receiving the signal representative of the number of vertical fields provides a switching signal to cause the switch to connect to the appropriate one of the plurality of delay lines in dependence upon the number of vertical fields. As a result, an NTSC picture having improved vertical resolution is obtained.

The present invention is also directed to a circuit for reconstructing a high definition video signal from a subsampled analog video signal based on a frame identification signal and an NTSC sync signal. The circuit includes means for identifying one of N NTSC video frames which corresponds to one high definition frame, where N is an integer greater than 1 and where the identified NTSC video frame is a reference NTSC video frame. The circuit includes means for reading out the reference NTSC video frame and means for storing the reference NTSC video frame. The circuit also includes means for sequentially combining the remaining N−1 NTSC video frames with the reference video frame to produce a reconstructed high definition video signal from the N NTSC video frames. In one embodiment, the circuit also includes means for storing N NTSC video frames corresponding to a single HD video frame and means for reading out the single HD video frame at the HD video scanning rate. By providing this circuitry for reconstructing the high definition video frame, an advanced receiver will be able to reproduce the high quality high definition video signal despite the fact that this signal has been subsampled and converted to make it compatible with NTSC transmission. Thus, the benefits of compatibility with existing NTSC receivers and an improved picture for those users having advanced receivers can both be achieved.

These together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a block diagram of a circuit for converting a high definition video signal corresponding to a high definition picture into a subsampled video signal compatible with NTSC transmission in accordance with the system of the present invention;

FIG. 4 is a block diagram of a circuit which may be connected to the circuit of FIG. 3 to provide necessary delays between NTSC frames to preserve the geometry of the sampling sites produced by the circuit of FIG. 3;

DETAILED DESCRIPTION OF THE PREFERRED EMBODIMENTS

One embodiment of the method and system of the present invention relates to the minimization of flicker which is produced as a result of horizontal subsampling. FIGS. 2(a)–2(h) are a series of diagrams for illustrating the subsampling of a high definition video signal ramp lasting for several cycles of the sampling clock. In the examples illustrated in FIGS. 2(a)–2(d), the sampling occurs over two sequential high definition television frames at clock times labelled 1' (frame 1) and 2' (for frame 2). Alternatively, the sampling could be done during a single high definition video frame at the sampling site spacing indicated by FIG. 2(a). FIGS. 2(c) and 2(d) illustrate the subsampled video data which is obtained via a sample and hold procedure for frame 1 and frame 2, respectively. If NTSC frame 1 and NTSC frame 2 are clocked out using a single phase clock (FIG. 2(e)) then the successive frames of NTSC video clocked out will be as illustrated in FIG. 2(f). Of course, these waveforms would be smoothed by low pass filtering (NTSC luminance bandpass). Thus, NTSC frame 2 will be shifted in its location in the picture as a result of the single phase clock which is used to clock out the successive frames. From the superposition of the successive waveforms in FIG. 2(f), it can be seen that the reproduced ramp will have higher average brightness in NTSC frame 2 than NTSC frame 1, thereby resulting in flicker. Further, the amount of the frame-to-frame difference is directly proportional to the slope of the high definition source video ramp.

Figure 2:
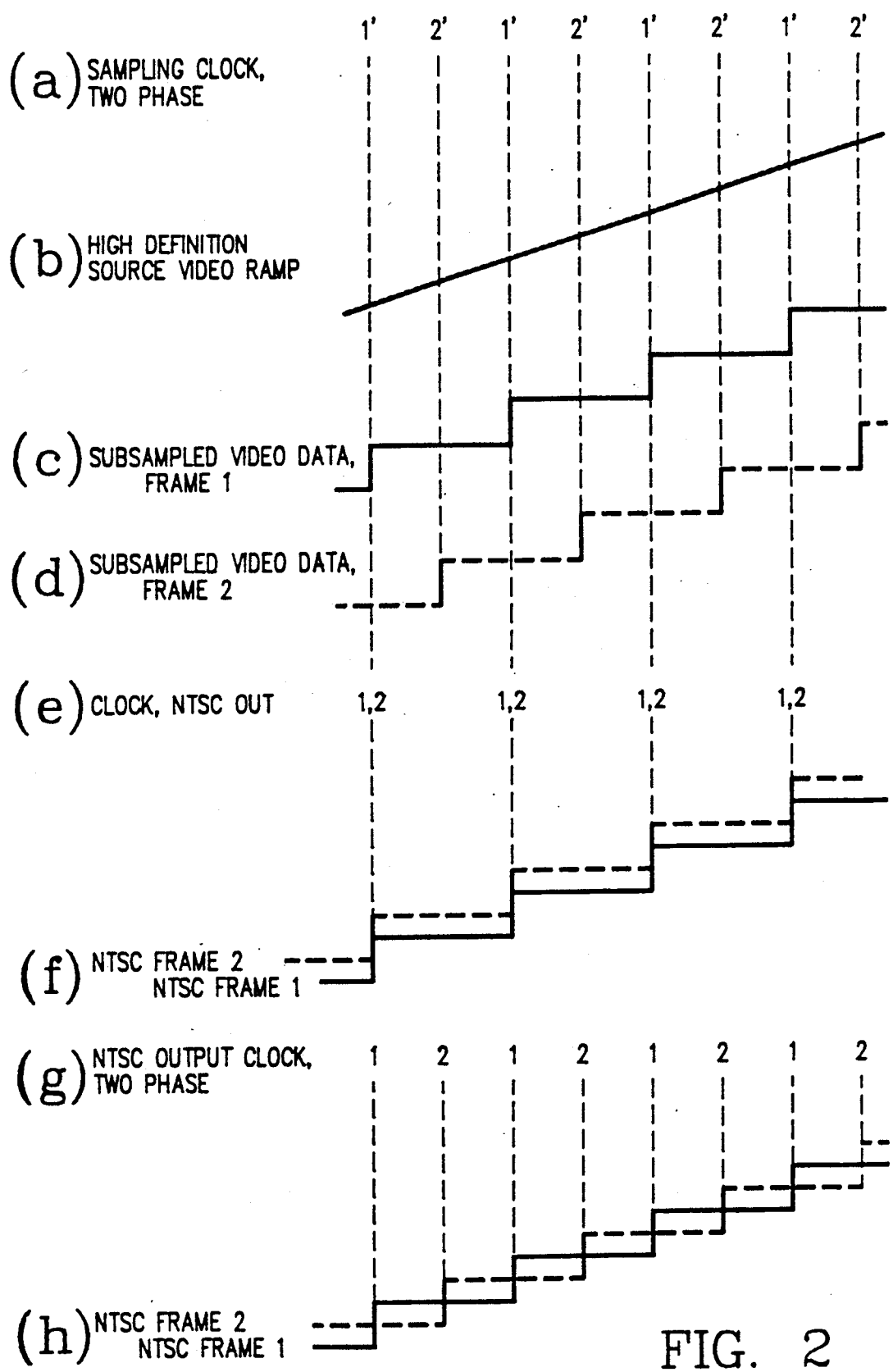
FIGS. 2(a)–2(h) are diagrams illustrating the preservation of the geometry of the subsampled data in the NTSC video frames in accordance with the present invention.

The method and system of the present invention seek to overcome the above-described deficiencies by employing an N-phase (where N is an integer greater than 1—for this example two-phase) NTSC output clock to preserve the original geometric interleaving of the subsampled video data in FIGS. 2(c) and 2(d) while making the subsampled video data NTSC compatible. Thus, as illustrated in FIG. 2(g), in accordance with the present invention an N-phase clock is employed, with frame 1 clock times being labelled 1, and frame 2 clock times being labelled 2. As a result, video signals for NTSC frame 2 and NTSC frame 1 are produced as illustrated in FIG. 2(h). From the superposition of these two frames, it is seen that the reproduced ramp (after low pass filtering) will have virtually the same average brightness in both frames. Further, for any two adjacent half pixels the average of each of the two waveforms is the same. Low pass filtering will remove the higher harmonics from the waveforms, producing virtually identical ramps in both frames, regardless of slope. Therefore, as illustrated in FIG. 2(h), by preserving the original geometry (i.e., the relative geographic positions) of the subsampled video data, flicker due to gradients of several pixels in extent can be minimized. While the example of FIG. 2 employed a linear ramp, the method of the present invention can also be used to reduce the flicker in a non-linear component of a non-linear gradient.

FIG. 3 is a block diagram of a circuit for subsampling and NTSC scan conversion in accordance with the present invention. A high definition (HD) video signal, which may be, for example, the high definition video ramp signal illustrated in FIG. 2(b), is input to an A/D converter 20. The HD video signal is also provided to an HD sync separating circuit 22 which separates the HD sync signal from the composite HD video signal and provides the HD sync signal to a sampling clock generator 24. Alternatively, the HD sync signal may be separately provided from an HD sync signal generator. The HD sync signal is used as a means for locking a sampling clock signal which is provided by the sampling clock generator 24, to the HD video signal by triggering the sampling clock generator 24. The A/D converter 20 converts the composite HD video signal (which is analog) to a digital video signal which is then provided to a memory 26. If desired, the sampling clock signal generated by the sampling clock generator 24 may be used to control the operation of the A/D converter 20. The sampling clock generator 24 provides the sampling clock signal to a write address logic and write control circuit 28 which provides a write address and a write enable signal to the memory 26 to cause the digital video signal output from the A/D converter 20 to be written into the memory 26. The control circuit 28 is reset by the HD sync signal at the end of each HDTV frame, and the sampling clock signal enables the control circuit 28 to cause writing of the digital video signal into the memory 26. In the preferred embodiment, the write address logic and write control circuit is a counter which successively provides addresses to cause data corresponding to the digital video signal to be written consecutively into the memory 26. In this embodiment, the counter can be incremented by the sampling clock signal output by the sampling clock generator 24 so as to cycle through all addresses of the memory to write in data for one HDTV frame. Alternatively, the memory 26 may be divided into areas corresponding to NTSC frames. For example, if three-phase subsampling is employed, the memory might include a first area for storing the first set of subsampling sites in a first HD video frame, a second area for storing the second set of subsampling sites in a second HD video frame and a third area for storing the third set of subsampling sites in a third HD video frame. The counter forming the control circuit 28 would be adjusted accordingly. In any event, the memory 26 is a frame memory which should be large enough to store at least one entire frame of high definition video. The sampling clock generator 24 and control circuit 28 cause each data word (picture element) from the output of the A/D converter to be stored in a unique location in the memory 26. The triggering of the sampling clock generator 24 by the HD sync signal causes specific picture elements of the high definition video picture to be mapped into specific locations in the memory 26.

An NTSC sync signal is also input to the system of FIG. 3 by any available source of an NTSC sync signal. For example, the NTSC sync signal may be provided by an NTSC sync generator (e.g., house sync) or it may be internal to the device. The NTSC sync signal is input to an output clock generator 30 which produces an output clock signal which acts to enable a read address logic and read control circuit 32. Thus, the output clock generator 30 causes the control circuit 32 to provide read addresses and a read enable signal to the memory 26 to enable reading of data from the memory 26. If desired, the output clock signal may also be used to control the D/A converter 34. The output clock generator 30 and the read address logic and read control circuit 32 cause selected picture elements to be read from the memory 26 at NTSC rates. The data forming the digital video signal which is read from the memory 26 is provided to a D/A converter 34 which produces a subsampled analog video signal. The subsampled analog video signal which is output by the D/A converter 34 is filtered by a low pass filter 36 to produce a filtered subsampled analog video signal which is sent to an NTSC encoder (or FIG. 4 or FIG. 14) along with a frame ID signal. The low pass filter 36 removes unwanted high frequency components. The frame ID signal may be provided from any suitable source at the transmission end, and is required to allow reconstruction of the high definition video signal by an advanced or high definition receiver.

In the circuit of FIG. 3, the output clock generator 30 and the control circuit 32 cause selected picture elements to be read from the memory 26 at NTSC rates, so that only a subset of the total number of picture elements is output during any one NTSC frame. The total number of picture elements corresponding to the HDTV picture is output over the course of N frames. To preserve the geometric relationships of the sampling process in the NTSC signal, the output clock signal can be made to exhibit a slightly different phase on successive frames relative to NTSC sync. These phase changes are chosen such that, in the reconstructed image, they result in the placement of each picture element at the same picture location from which it was sampled in the original high definition image. To achieve this result, the output clock generator 30 can be a clock generator which delays the clock signal by a predetermined time at the beginning of each frame, so as to delay the outputs of each NTSC frame by predetermined times relative to the preceding NTSC frame. This can be done by inserting a variable delay into the output clock generator circuit 30 or by employing a natural offset caused by choosing a particular frequency relationship for the output clock 30.

The memory 26 which is employed in the system of the present invention may be formed in a number of ways. For example, while the memory 26 is described as being digital, an analog memory could be employed, in which case the A/D converter 20 and the D/A converter 34 could be deleted from the circuit. Also, serial memories of sufficient size could be employed, where different clocking rates are to be used in storage and retrieval. With a serial stream of picture elements being output by a serial memory, subsampling is accomplished by using only a subset of the available picture elements each frame, and a different subset each frame. If a digital memory is employed as the memory 26, the memory 26 may be formed by interleaved banks of memory, one high speed memory or two frame memories having a high definition video frame size. The only requirement is that the memory be large enough to store one or more high definition video frames, and that the memory 26 be separately addressable for read and write operations. That is, it must be possible to read and write simultaneously. One approach is to use multiple frame storage capacity in which more than one HD frame will be in the memory at the same time. While write circuitry is storing the incoming HD frame in one part of the memory, the read circuitry can concurrently read data from another part of the memory where an earlier HD frame was previously written. In this manner, read and write operations may be conducted independently, but with a delay. The key is that a particular position in an HD video frame be mapped into a particular memory location in memory 26.

The address which is provided by the read address logic and read control circuit 32 may employ bits for bank select of a particular bank of memory or bits for reading out every nth bit from memory if subsampling is to occur on the output side of the memory. Alternatively, if the first, second and third subsampling points have been read into independent portions of memory, it is only necessary to read out one set of subsampling points for each NTSC frame.

In order to preserve the geometry (i.e., relative geographic positions) of the subsampling points, the output clock generator 30 is made to exhibit a slightly different phase on successive frames relative to the NTSC sync. These phase differences are chosen such that, in the reconstructed image, they result in the placement of each picture element at the same picture location from which it was sampled in the original high definition picture. This corresponds to using an N phase clock signal (where N is an integer corresponding to the number of subsamplings which occur) such as the two-phase clock signal which is illustrated in FIG. 2(g). Further, such a delayed clock may be implemented by building in an incremental delay which is counted up for each frame, and then reset to zero when the Nth set of subsampled values has been read out.

In an alternate embodiment, an undelayed or single-phase clock signal is output by the output clock generator 30, and a Variable delay line is coupled to the low pass filter 36. This alternate embodiment is illustrated in FIG. 4 which illustrates the use of controlled delays in the form of delay lines $38_1$ to $38_{N-1}$ which are selectively connected by a switch 40 to an output provided to the NTSC encoder. The switch 40 is controlled by a control signal produced by a frame counter 42 which receives and counts the NTSC sync signal. While the controlled delay circuit of FIG. 4 is illustrated as being connected to the output of the low pass filter 36, it can also be coupled between the D/A converter 34 and the low pass filter 36. As the switch 40 is switched under the control of the frame counter 42, the subsampled analog video signal is selectively delayed by the variable delays provided by delay lines $38_1$ to $38_{N-1}$.

The primary principle of the method and system of the present invention is to display picture elements in the NTSC frames with the same geographic positions as the corresponding sampling sites from the HD frame. Therefore, if the HD video signal has the same scanning rates as NTSC, then if sampling takes place in real time, the geometry of the sampling points can be maintained, thereby minimizing flicker.

Figure 5:
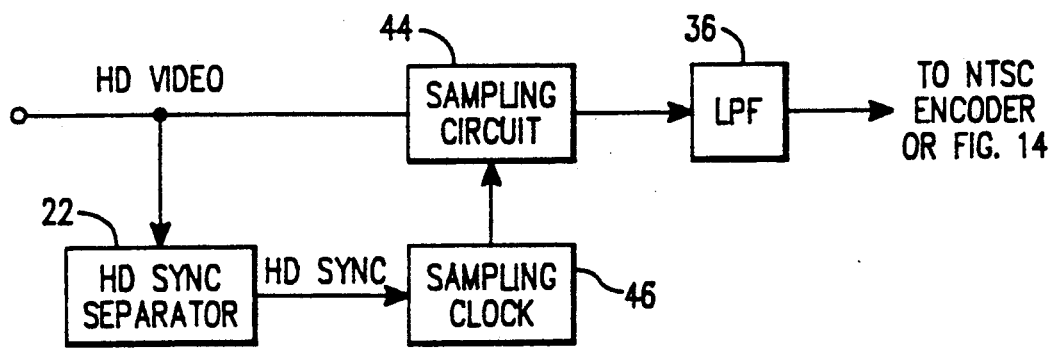
FIG. 5 is a block diagram of a circuit for converting a high definition video signal corresponding to a high definition picture, into a subsampled video signal compatible with NTSC transmission, for the situation where the high definition video signal is produced at NTSC scan rates.

FIG. 5 is a block diagram of an alternate embodiment of the present invention in which the high definition video signal has already been scan converted to NTSC compatible scan rates, but retains the higher amount of detailed information of the high definition picture. This type of NTSC video signal can be subsampled in real time by a sampling circuit 44 which receives the HD video signal and which is coupled to a sampling clock generator 46 for producing a sampling clock signal locked to the NTSC compatible HD sync signal, and having the necessary phase differences from frame-to-frame. The sampling circuit 44 of FIG. 5 may be a switch such as a switched capacitor, FET switch, etc. The sampling clock 46 has a variable delay so that sampling is started at an offset time for each frame (as identified by the HD sync) so as to generate the appropriate spaced relative positions along a picture line for the sampling sites. Since no memory 26 is required, the sampling clock generator 46 replaces the sampling clock generator 24 and the output clock generator 30 of FIG. 3. As a result, the geometry of the sampling sites is automatically preserved in the output. If the high definition picture is to have more scan lines than NTSC, vertical subsampling (described below) can be included in the scan conversion algorithm. Alternatively, the same type of wideband input signal using NTSC scan rates can be produced directly by using a high resolution camera. Vertical subsampling can be achieved in the camera through modified deflection techniques.

As indicated above, the system of the present invention preserves subsampling phase differences in the NTSC signal. FIG. 2 illustrated the example of a high definition video ramp. An analysis of the flicker in the vicinity of a step function which corresponds to a sudden change in video level, for the system of the present invention is provided below. This is particularly appropriate since any waveform can be viewed as the superposition of a number of step signals.

FIGS. 6(a)–6(l) present a series of diagrams comparing the region of NTSC flicker when the system of the present invention is employed (FIG. 6(h)) and when a standard subsampling system is employed (FIG. 6(l)) for the case of a video step. In both instances, the two-phase sampling clock of FIG. 6(a) and the video step of FIG. 6(b) will produce subsampled video data for HD frames 1 and 2 as illustrated in FIG. 6(c) and FIG. 6(d). In the case of the system of the present invention where a two-phase NTSC output clock is employed, NTSC video signals for NTSC frame 1 and NTSC frame 2 illustrated in FIGS. 6(f) and 6(g) will be generated, so that the region of flicker is one-half NTSC pixel wide as illustrated in FIG. 6(h). In contrast, when a single phase NTSC output clock is employed as illustrated in FIG. 6(i), NTSC video signals for NTSC frames 1 and 2 as illustrated in FIGS. 6(j) and 6(k), respectively, are provided, and the region of flicker is one full NTSC pixel wide as illustrated in FIG. 6(l).

FIGS. 7(a)–7(h) are diagrams for illustrating an example wherein the position of the video step (with respect to the sampling clock) is slightly different from that illustrated in FIG. 6(b). In this case, the subsampled video data is such that it produces no region of flicker, despite the fact that the subsampled video is transmitted without sampling phase shifts preserved. Thus, when geometry is preserved in a two-phase subsampling system, the region of flicker will always be one-half NTSC pixel wide (FIGS. 6(e)–6(h)). In contrast, when geometry is not preserved, the region of flicker will be either zero width (FIGS. 7(e)–7(h)) or one NTSC pixel wide (FIGS. 6(i)–6(l)). Therefore, when geometry is not preserved, the resulting flicker for some video steps will be twice as wide as for the case where geometry is preserved. Viewed another way, the average amount of flicker will be the same in both cases. However, because the thresholds of flicker perception by the viewer are of interest, the present invention provides the advantage of minimizing the worst case flicker, so that the situation illustrated in FIG. 6(l) never occurs.

Figure 6:
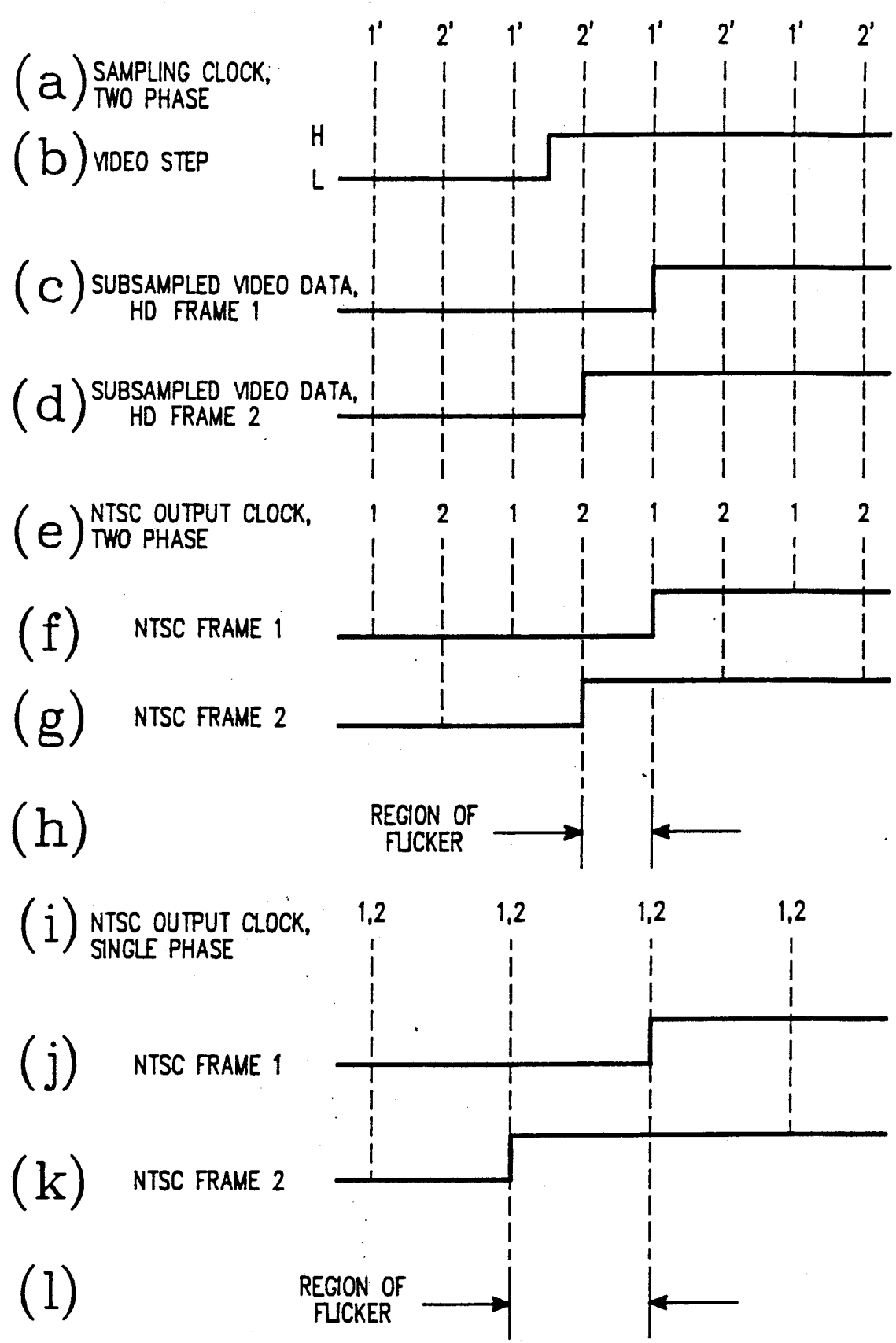
FIGS. 6(a)–6(l) are diagrams illustrating the region of NTSC flicker which is produced when the circuit of FIG. 3 is employed with a video step input, and a comparison with the region of NTSC flicker produced when the type of subsampling described with respect to FIG. 1 is employed.
Figure 7:
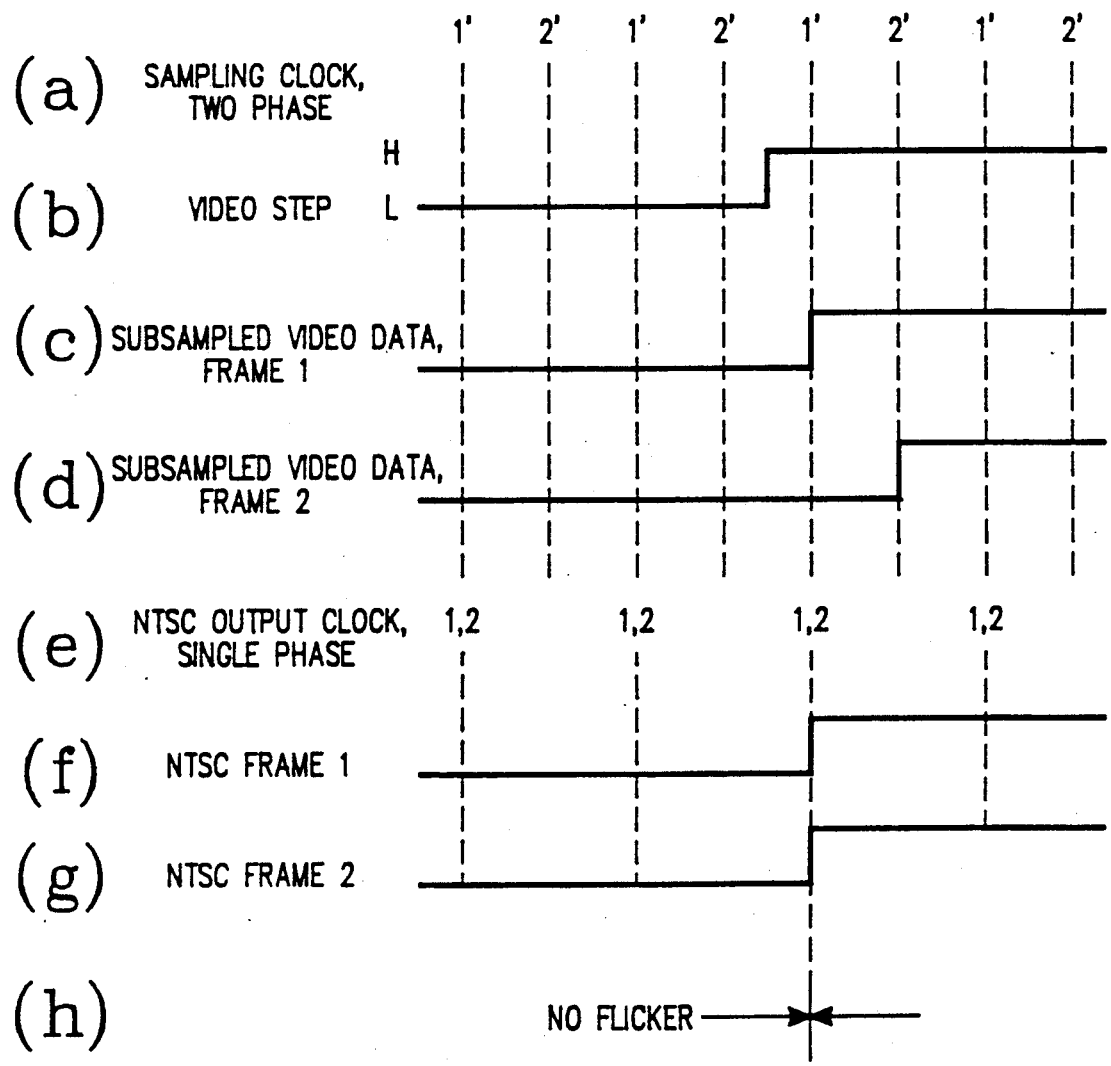
FIGS. 7(a)–7(h) are diagrams illustrating the region of NTSC flicker produced for another example of a video step input signal when the type of subsampling described with respect to FIG. 1 is employed.
Figure 8:
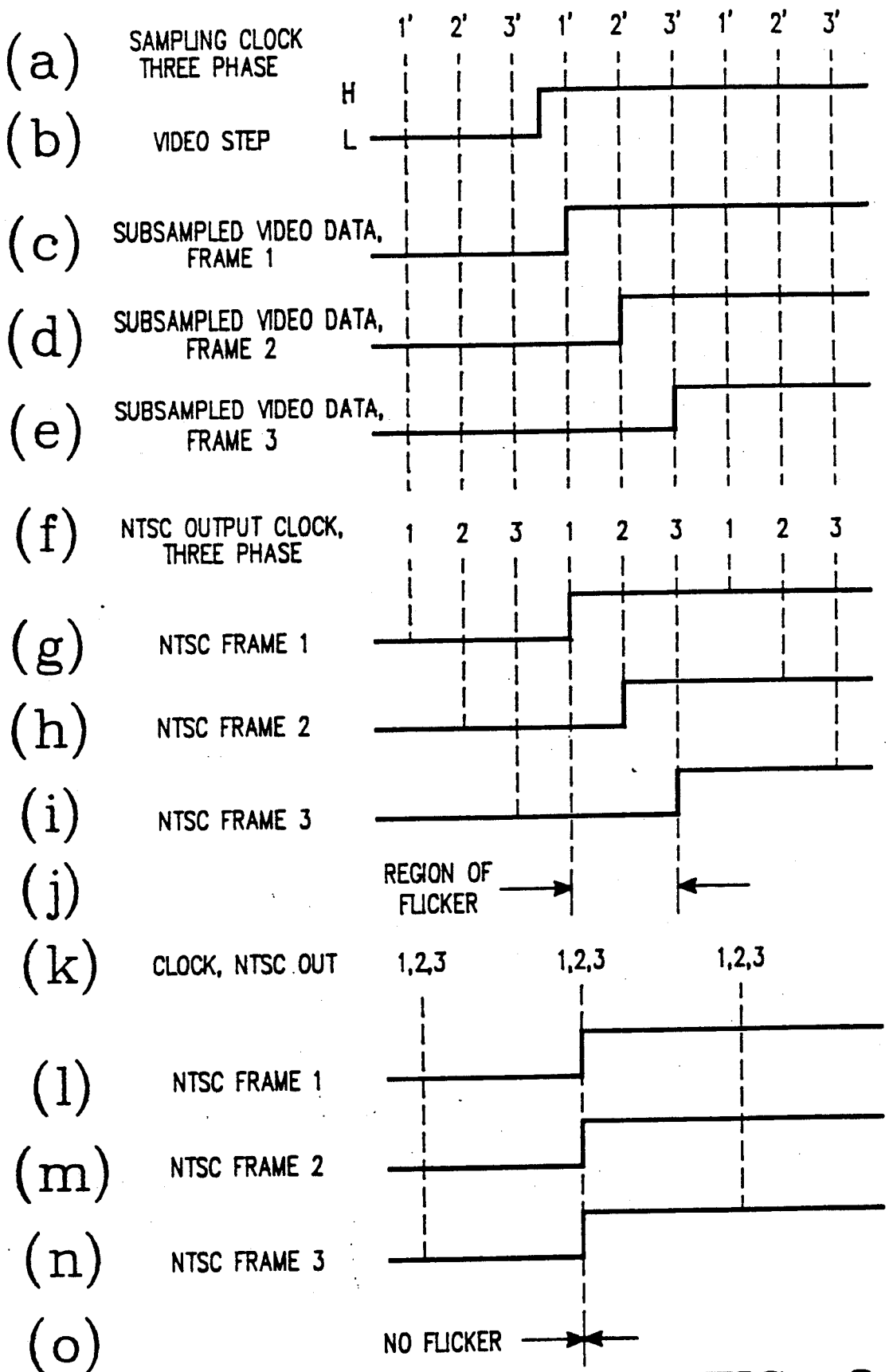
FIGS. 8(a)–8(o) are diagrams, similar to those in FIGS. 6(a)–6(l), but for three-phase subsampling.
Figure 9:
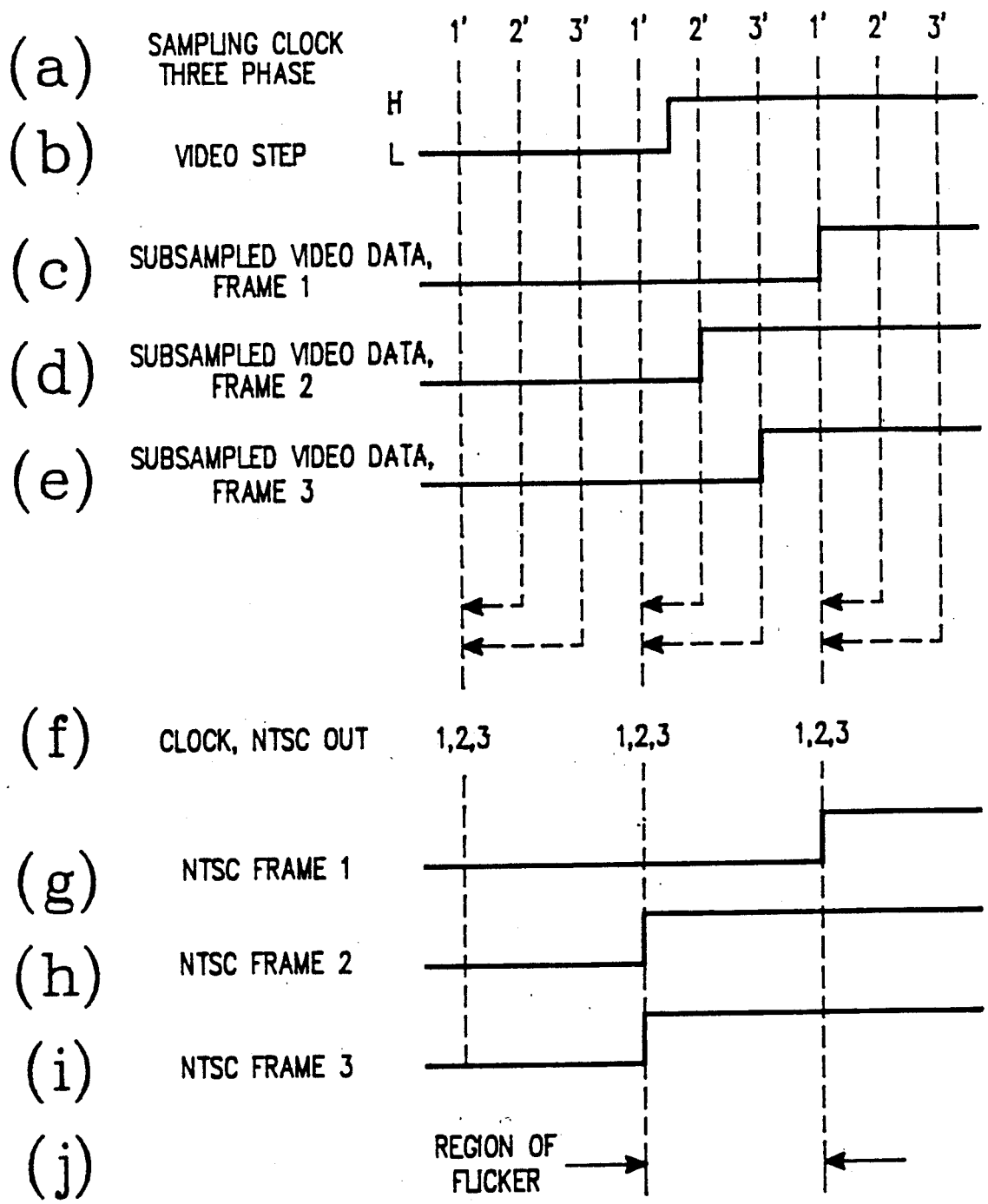
FIGS. 9(a)–9(j) are diagrams illustrating the region of NTSC flicker which is produced for one example of a video step when the type of subsampling illustrated in FIG. 1 is employed for three-phase sampling.
Figure 10:
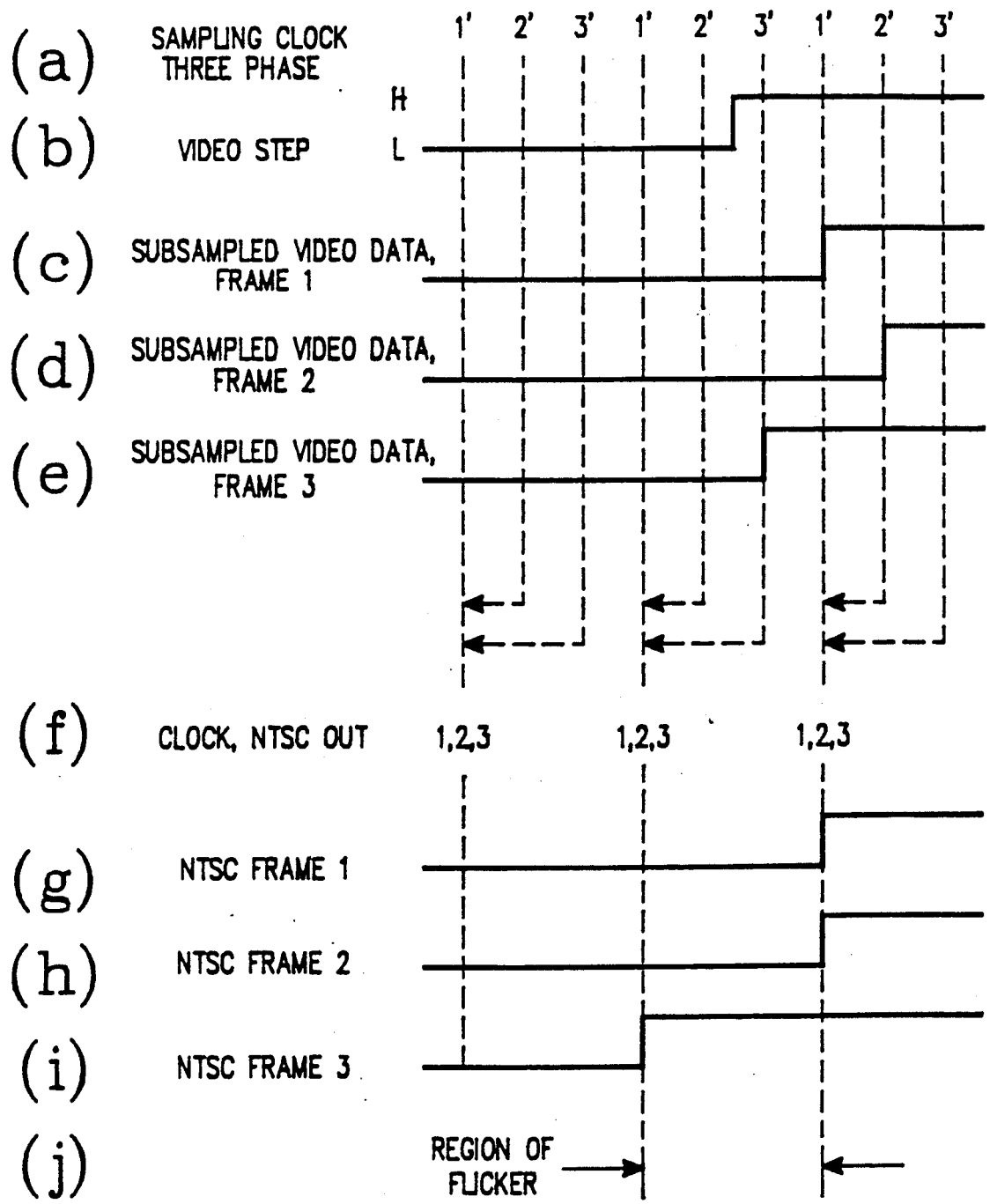
FIGS. 10(a)–10(j) are diagrams, similar to FIGS. 9(a)–9(j), for illustrating the region of NTSC flicker produced when the type of sampling illustrated in FIG. 1 is employed with three-phase sampling.

FIGS. 8–10 compare the regions of flicker for the present invention and the prior art in a manner similar to FIGS. 6–7, but for the case of three-phase subsampling.

FIGS. 8(a)–8(o) illustrate the region of flicker when the video step has an edge following subsample 3 (FIG. 8(b)). When the system of the present invention is employed to preserve geometry, a region of flicker which is two-thirds NTSC pixel wide is produced (FIG. 8(j)). In contrast, when the geometry is not preserved, no region of flicker is produced (FIG. 8(o)). However, if the edge of the video step occurs in other sampling positions (see FIG. 9(b) and FIG. 10(b)), then a region of flicker which is one NTSC pixel wide is produced (see FIGS. 9(j) and 10(j)). As in the example of the two-phase system of FIGS. 6 and 7, the average amount of flicker for a three-phase system is the same, but the flicker is more concentrated at certain locations along the picture when geometry is not preserved.

In view of the above, it can be generally stated that for an N-phase sampling sequence, the region of flicker in the NTSC display will be N−1 high definition sites or (N−1/N) NTSC pixels wide. Thus, the system of the present invention reduces worst case flicker for edges, as well as eliminating flicker due to gradually varying brightness.

Figure 1:
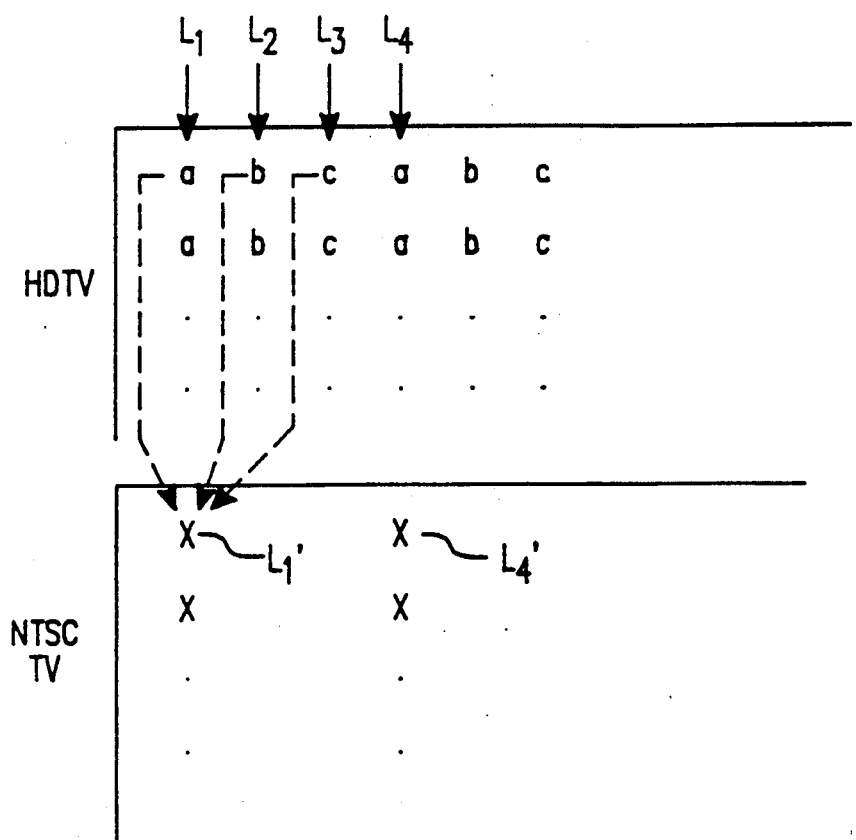
FIG. 1 is a diagram for illustrating a prior art method of subsampling a high definition television picture and mapping it onto an NTSC picture.
Figure 11A:
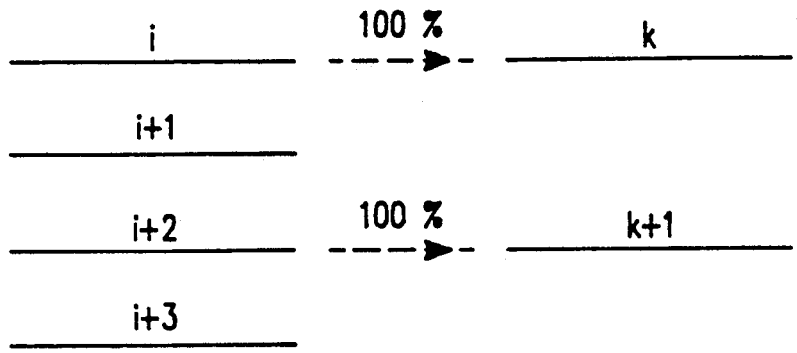
FIGS. 11A and 11B are diagrams illustrating the type of vertical subsampling employed in the prior art.
Figure 11B:
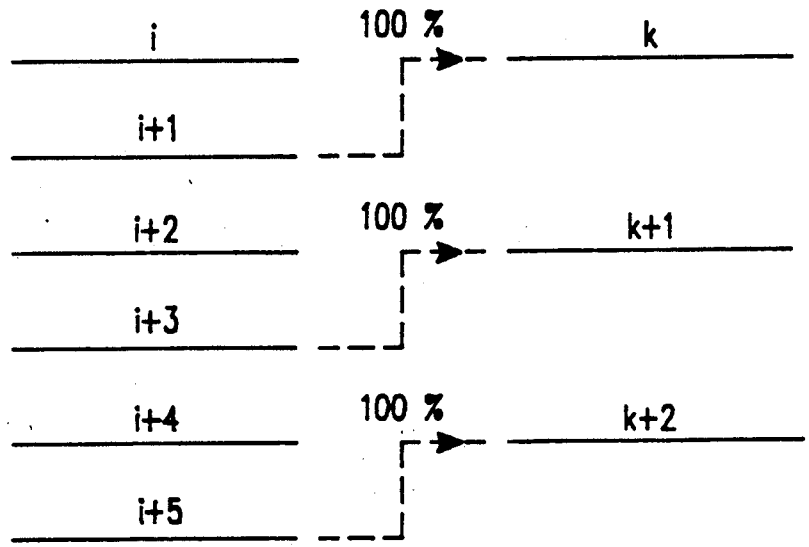

The system of the present invention is also directed to minimizing flicker when vertical subsampling is employed. In one approach described above, two high definition scan lines are employed for every NTSC scan line. If alternate high definition scan lines are employed in alternate frames of the NTSC signal, as illustrated in FIG. 11A and FIG. 11B, then the pixels on the scan lines will be displayed on the NTSC receiver in a manner which does not preserve their original relative geographic positions vertically. As illustrated in FIG. 11A, in NTSC frame 1, if i is assumed to be even, the even numbered lines of the high definition picture may be mapped onto the lines of NTSC frame 1. Then, in NTSC frame 2 (FIG. 11B), the odd numbered high definition picture lines will be mapped onto the same lines as in NTSC frame 1, so that the odd numbered lines of the high definition picture are geographically displaced from their original position in the HD picture. This is the vertical equivalent of the problem of horizontal displacement described above with respect to FIG. 1. Because line-to-line differences do not receive the smoothing effects of low pass filtering, the vertical sampling analysis for the video ramp function would result in a step function for each frame as illustrated in FIG. 2(f). Thus, with a vertical gradient, there is no electrical smoothing of the steps in brightness between adjacent lines of the same NTSC frame. Nevertheless, the average brightness in a vertical gradient will be more equal from frame-to-frame if the micro geometric relationships are preserved, and flicker due to vertical subsampling will be reduced.

Figure 12A:
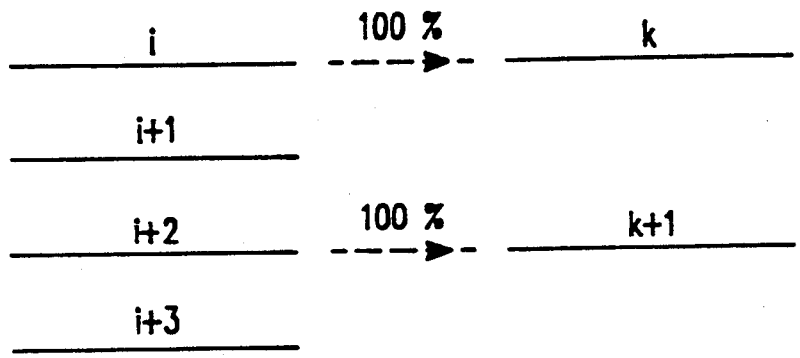
FIGS. 12A and 12B are diagrams illustrating a method of vertical subsampling in accordance with the present invention.
Figure 12B:
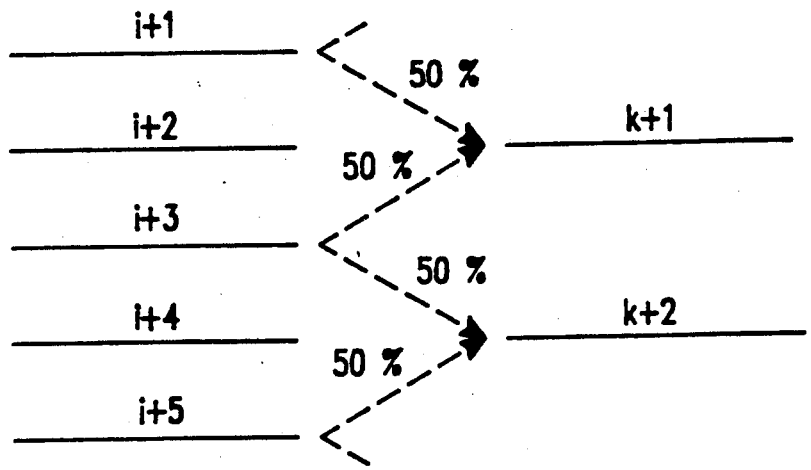

In accordance with an embodiment of the present invention, high definition line combining (NTSC line splitting) techniques are employed to reduce flicker due to vertical subsampling. FIGS. 12A and 12B are diagrams which illustrate one example of this method, as applied to the case where there are twice as many lines in the high definition picture as in the NTSC picture. In FIG. 12A, the even and odd lines of the first NTSC frame are obtained from alternate lines (e.g., even lines only) of the high definition frame. Then, as illustrated in FIG. 12B, in the second NTSC frame, the even and odd lines of the second NTSC frame are obtained by combining the other (unused) lines of the high definition frame (i.e., the odd lines). In the example illustrated in FIG. 12B, in the second NTSC frame, each NTSC line contains equal contributions from the high definition lines which are located above and below the NTSC line into which they are combined. That is, the odd high definition lines fall geometrically midway into the spaces between the NTSC lines. In the presence of a vertical gradient and shading, the flicker effects of this geometric error are reduced when the NTSC lines are interpolations; that is, when each odd line from the high definition picture makes an equal contribution to the NTSC line above and the NTSC line below.

Figure 12C:
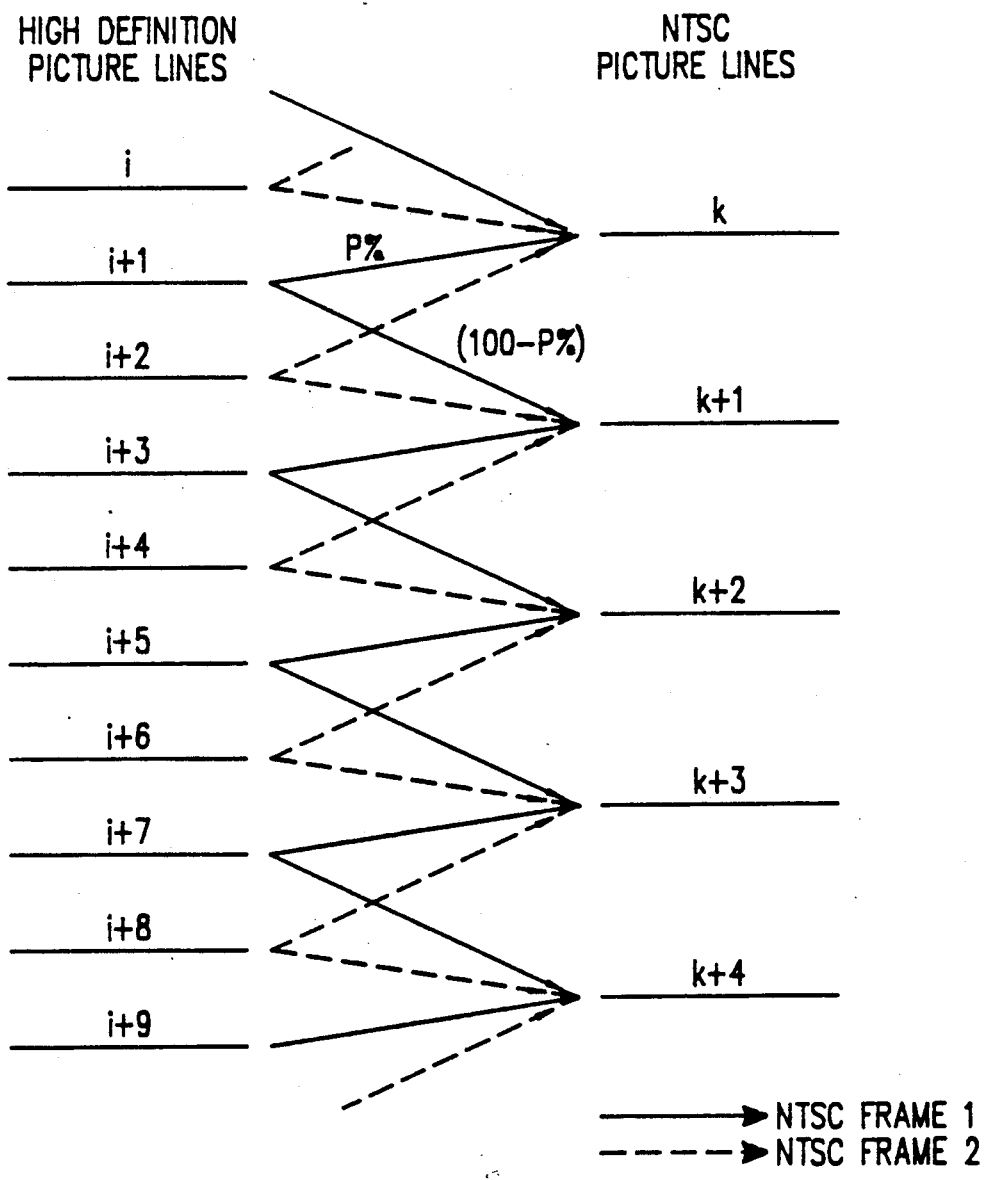
FIG. 12C is a diagram illustrating an alternate embodiment of a method for vertical subsampling in accordance with the present invention.

FIG. 12C illustrates another example of combining line values in accordance with the system of the present invention, for situations in which no NTSC picture lines are coincident with the high definition picture lines. In this case, every NTSC line will be a combination of nearby high definition lines with proportions chosen to minimize flicker. In this case, unequal weighting of the contributions of the high definition picture lines into the NTSC picture lines into which they are mapped is dictated because of the unequal spacing. A variety of ratios of numbers of lines may be used. In the general case, the number of high definition picture lines is not evenly divisible by the number of NTSC lines. When this occurs, the weighting used to obtain one NTSC line may be different from that used to obtain the previous NTSC line, and only for rational ratios made up of relatively small integers will the pattern of weightings used repeat during a frame.

Figure 13:
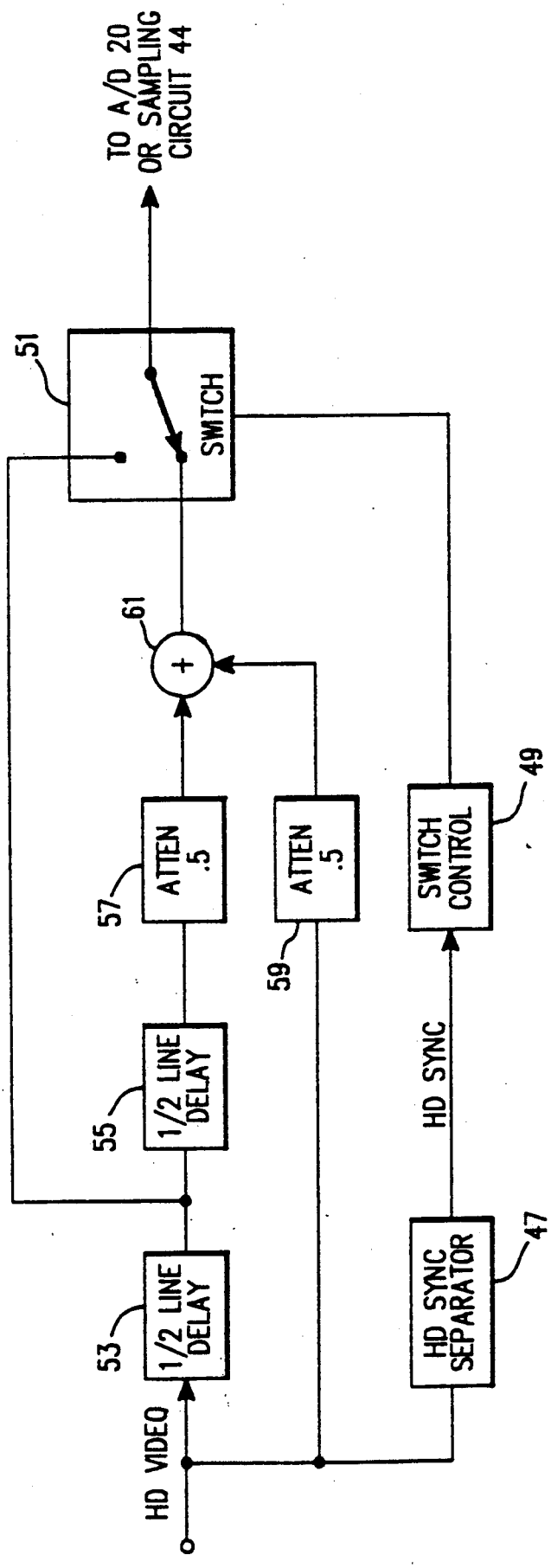
FIG. 13 is a block diagram of a circuit for performing vertical subsampling in accordance with the method illustrated in FIGS. 12A and 12B.

FIG. 13 is a block diagram of a circuit for carrying out the line combining method of the present invention which is illustrated in FIGS. 12A and 12B. Referring to the circuit of FIG. 13, a high definition video signal is input, and an HD sync separator 47 is used to separate out the HD sync signal. As before, the HD sync signal can be provided from any suitable source, so that an HD sync separator 47 is not necessarily required. The HD sync signal is provided to a switch control circuit 49 which provides a switching signal to a switch 51. The switching signal causes the switch 51 to switch between a first position (corresponding to FIG. 12A) and a second position (corresponding to FIG. 12B). As shown in FIG. 13, the switch 51 is in the second position which corresponds to NTSC frame 2 as illustrated in FIG.

12B. The HD video signal is provided to a one-half line delay circuit 53 which provides a delayed output to the switch 51, so that when the switch 51 is in the first position, the one-half line delayed HD video signal will be provided as an output. Thus, during NTSC frame 1, the lines are not combined but are provided directly as an output by the switch 51. A one-half line delay circuit 55 delays the output of the one-half line delay circuit 53 and provides the delayed output to an attenuator 57. In the embodiment illustrated in FIG. 13, the attenuator 57 has an attenuation factor of 0.5 which corresponds to the example illustrated in FIG. 12B. The HD video signal is also provided directly to an attenuator 59 which also has an attenuation factor of 0.5. The outputs of the attenuators 57 and 59 are provided to an adder 61 which adds the attenuated outputs in a manner corresponding to the illustration in FIG. 12B and this combined output is provided to the switch 51. When the switch 51 is in the second position, the output of the adder 61 is provided as an output.

As illustrated in FIG. 13, the output of the switch 51 may be provided as an input to the A/D converter 20 of FIG. 3 or the sampling circuit 44 of FIG. 5 in place of the HD video signal which is illustrated as the input to these circuits. It should be noted that the switch control 49 will be field dependent if the HD sync standard uses 2:1 interlace. The switch control 49 will be even/odd line dependent if the HD standard uses progressive scan. In addition, with progressive scan, the delays of the one-half line delay circuits 53 and 55 should be increased to one line each.

The circuit of FIG. 13 can be altered to perform the type of line combining pictured in FIG. 12C. One approach is to replace the path to the upper position of the switch 51 shown in FIG. 13 with a new path between the HD video input (i.e., the input to one-half delay line circuit 53) and the input to the upper position of the switch 51. This new path would include a delay, two attenuators and an adder connected in a manner similar to that already shown in the path to the lower position of the switch 51. The two delay circuits 53 and 55 shown in FIG. 13 could then be combined, since there would no longer be any connection between the delay circuits 53 and 55. The magnitudes of the desired delays and attenuations (P% and 100−P% in FIG. 12C) would depend on the line spacing.

In the general case, line combining can be performed by a relatively simple variation of FIG. 13, even for systems in which the number of high definition picture lines is not evenly divisible by the number of NTSC lines. For the general case, the HD video input is connected to the inputs of two or more video delay devices. The output of each delay device is connected through an attenuator associated with that delay to the input of an adder having the required number of inputs. The output of the adder may be supplied as an input to the A/D converter 20 of FIG. 3 or the sampling circuit 44 of FIG. 5, or to the input of any other appropriate next stage of video signal processing. In this general circuit, no switch corresponding to switch 51 of FIG. 13 is required. Instead, the delays and attenuator gains are varied electronically as required by the line spacing requirements. A controller would employ the HD sync signal to vary the delays and attenuations in a manner determined by the current line spacings.

Another method for reducing flicker in accordance with the present invention is a system of pixel time averaging. If a subsampled system uses an N frame NTSC sequence (i.e., a 2N field sequence) and the video for one of the subsampled frames is substituted for that of the other N−1 frames, and transmitted repeatedly in their place, there would be no subsampling flicker in the NTSC picture. However, there would also be no frame to frame differences for an advanced receiver to use in reconstructing the high definition picture. For a subsampling system using an N frame sequence, a reference frame, for example, the first frame, is transmitted normally, and the second frame transmitted contains a linear combination of the first and second frames. The third frame transmitted contains a linear combination of the first and third frames, and so on, until the sequence repeats with a new first frame.

By using the above-described pixel time averaging process, flicker is reduced in the NTSC receiver by virtue of having a larger common component (smaller differences) from frame-to-frame. In the advanced receiver, the first frame video could be stored and then subtracted from the other transmitted frames to reconstruct the high definition video signal. This type of averaging can be applied to entire frames or to certain patterns of subsampled pixels to achieve reductions in flicker along certain axis. Linear or non-linear formulas for combining frame-to-frame pixel values can be employed, and any formula which results in smaller frame-to-frame differences due to subsampling will reduce flicker in the NTSC image. However, by reducing the magnitude of the frame-to-frame differences caused by subsampling, this method achieves reduced flicker in the NTSC receiver at the expense of increased sensitivity to noise in the advanced receiver, but it does so without imposing any reduction in the resolution of the high definition picture. Further, advanced receivers could be designed to detect and respond to an ancillary signal in a television signal specifying the degree of processing being used, so as to control the degree of reverse processing performed by the advanced receiver. In this manner, the amount of flicker reduction could be adjustable and made dynamic. Further, should NTSC flicker ever cease to be an important issue, this type of processing could be phased out completely.

Figure 20A:
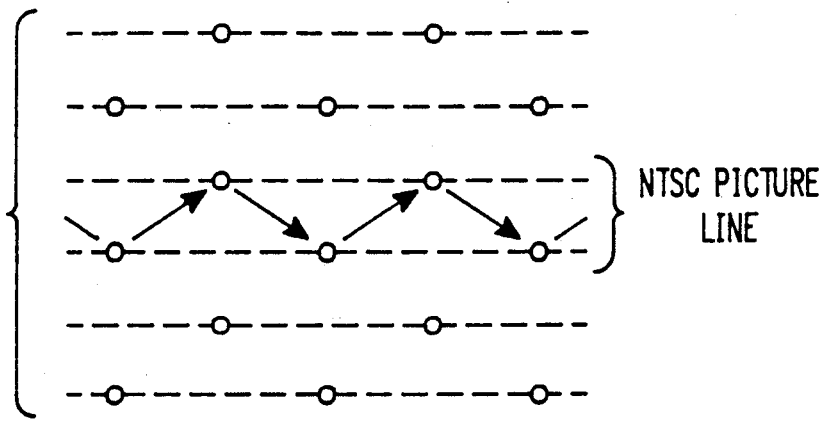
FIGS. 20A, 20B and 20C are diagrams illustrating alternate embodiments of the method of the present invention in which a pixel splitting/combining technique is applied to sampling patterns where pixels originally sampled with a variety of vertical coordinates are to be encoded into the same line of an NTSC compatible system.
Figure 20B:
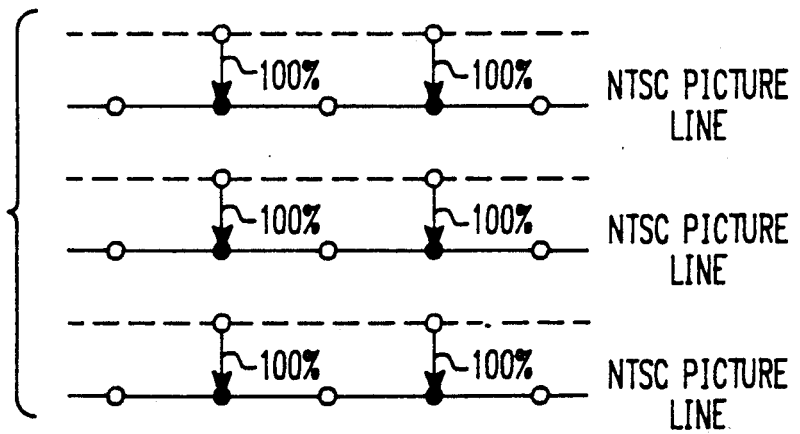
Figure 20C:
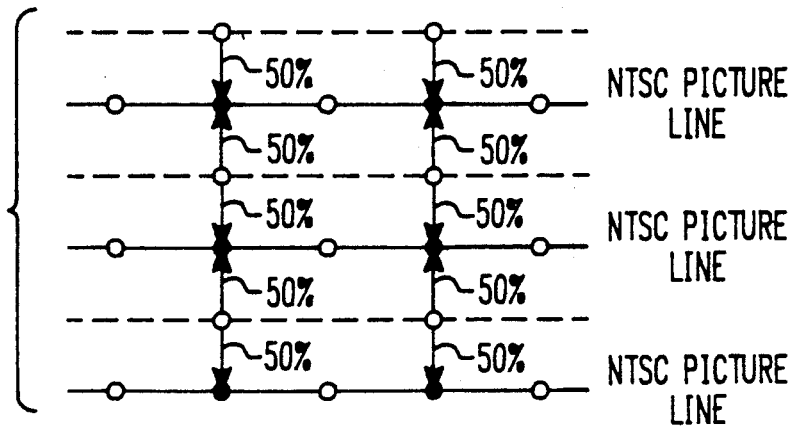

As described above, FIGS. 11, 12 and 13 relate to a system in which whole lines are sampled with consistent vertical offsets relative to the NTSC lines. That is, this system is directed to a pixel splitting/combining method for representing the vertical component of the sampling geometry when sampling locations not coinciding with the existing NTSC lines are encountered. However, the present invention is not limited to this type of method but instead is more generally applicable to a system employing both horizontal and vertical subsampling, in which the horizontal and vertical subsampling techniques can be combined as required for any pattern of subsampling. For a subsampling pattern producing NTSC lines along which some pixels are sampled with a vertical offset and some are not, the vertical technique can be applied selectively to those pixels which were originally sampled with a vertical offset. FIG. 20A illustrates an example in which the transmitted (NTSC compatible) line is derived from pixels originally sampled from high definition picture lines with different vertical coordinates. FIG. 20B illustrates the same sampling pattern as FIG. 20A, but with one set of coordinate values chosen to be coincident with the NTSC line. FIG. 20C illustrates a method in which the pixel splitting/combining method is applied to only those pixels which were originally sampled at sites not coinciding with NTSC line locations.

Figure 21:
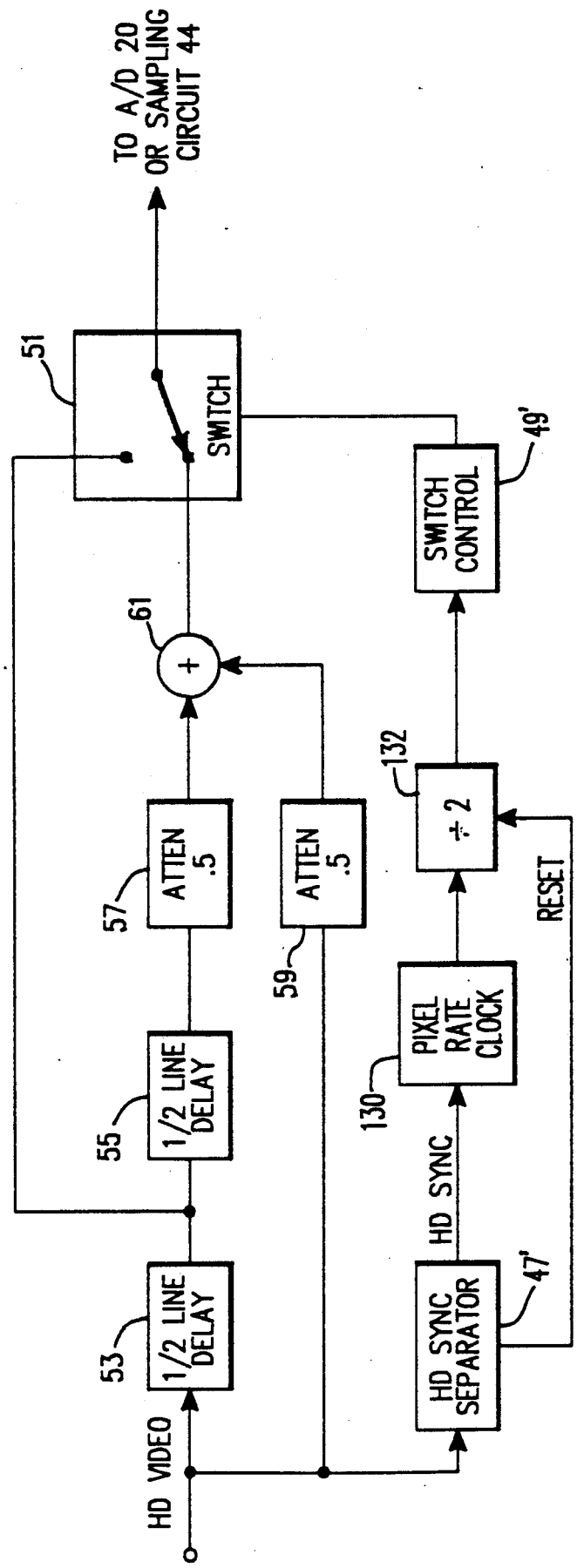
FIG. 21 is a block diagram of a circuit for performing subsampling to produce the type of vertical processinq illustrated in FIGS. 20A to 20C.

FIG. 21 is a block diagram of a circuit for carrying out the vertical processing method described above with respect to FIGS. 20A–20C. The circuit of FIG. 21 is similar to that of FIG. 13. Therefore, for convenience, only those elements which are not in FIG. 13 are described below. In this circuit, the HD sync separator 47' generates a reset signal as well as the HD sync signal. The HD sync signal is provided to a pixel rate clock 130 which is a high frequency clock. A counter 132 receives the output of the pixel rate clock 130 and the reset signal from the HD sync separator 47' and controls the output switch 51 via the switch control circuit 49' so that processing is applied to those pixels with vertical offset but is not applied to those with no vertical offset. For more complex sampling patterns and NTSC mappings, the circuit of FIG. 21 can be modified to process pixels belonging to multi-subsets involving various offsets and various line spacings. For example, the magnitudes of the delays 53 and 55 (e.g., tapped delays) and the gains of the attenuators 57 and 59 can be electronically controlled and varied by a controller locked to the pixel rate clock 130 according to the specific requirements of the sampling technique being employed.

Figure 14:
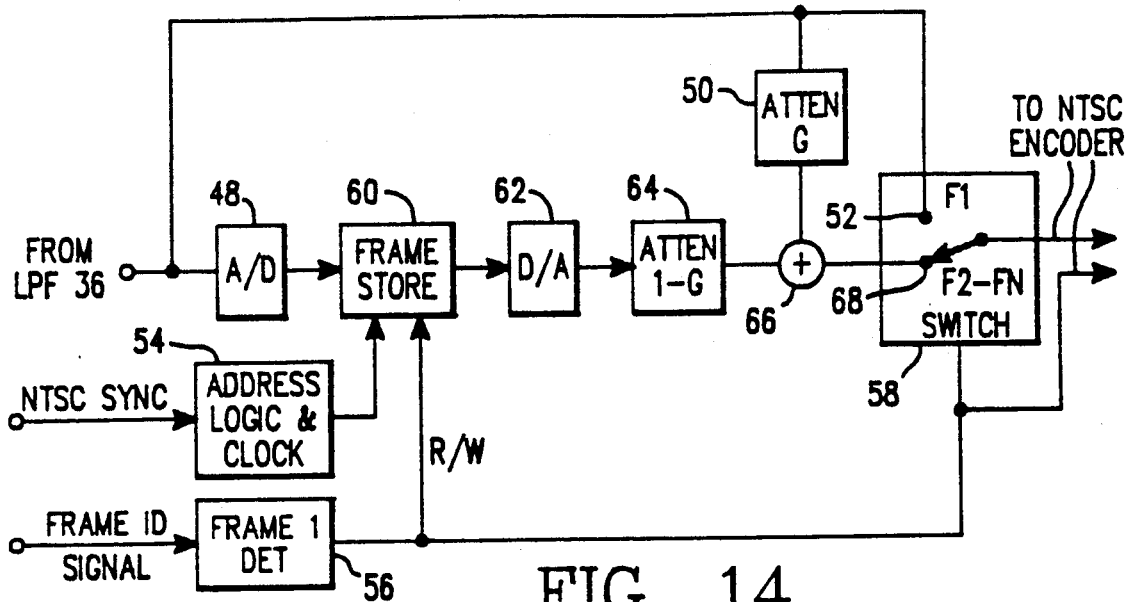
FIG. 14 is a block diagram of a circuit for performing subsampling by combining the NTSC frames which correspond to the HDTV frame, in accordance with the present invention.

FIG. 14 is a block diagram of a system in accordance with the present invention for adding together attenuated values of subsampled frames. The system of FIG. 14 is connected to the output of the low pass filter 36 of FIG. 3, so that the subsampled analog signal from the low pass filter 36 is provided to an A/D converter 48, and is also provided directly to an attenuator 50 and an output 52. The NTSC sync signal is provided to an address logic and clock circuit 54, and a frame identification signal is provided to a frame 1 detector 56. The NTSC sync signal which is provided to the address logic and clock circuit 54 acts as a reset signal to lock the clock signal to the sync signal. The address logic and clock circuit 54 may be a counter which cycles through the addresses of the frame store. The frame 1 detector provides an output which indicates when frame 1 is being processed. This frame 1 detection signal is provided to a switch 58 and a frame store 60. When frame 1 is being received, the frame 1 detection signal causes the switch 58 to connect to the output 52 so as to provide frame 1 as an output. In addition, the frame 1 detection signal acts as a write signal to cause frame 1 to be written in the frame store 60 after processing by the A/D converter 48. For succeeding frames after frame 1, the frame 1 detection signal causes the switch 58 to move to the position illustrated in FIG. 14, so that the frame currently being processed is no longer supplied directly as an output. Instead, the current frame $F_N$ is provided to an attenuator 50 having an attenuation value G. Further, for frames after frame 1, the frame detection signal acts as a read signal causing the frame 1 data to be read from the frame store 60 and provided to a D/A converter 62 and then to an attenuator 64 having an attenuation value of $1-G$. The attenuated analog signals produced by the attenuators 50 and 64 are added by an adder 66 and provided to an output 68 to which the switch 58 is connected. As a result, a combination of lines is output as the subsampled analog video for all but the first frame. The subsampled analog signal provided at the output of the switch 58 is provided to an NTSC encoder in combination with the frame 1 detection signal. It is necessary to provide the frame 1 detection signal in order to reconstruct the high definition video signal. The value of G is selected based on a determination of the appropriate balance or tradeoff between edge flicker and signal-to-noise ratio. The higher the value of attenuation of the attenuator 64, the less flicker that occurs, but the greater the noise. It should be noted that the system for reducing flicker due to vertical subsampling requires additional complexity in the high definition or advanced receiver because an extra memory is required to store data for the reference frame.

Another method of reducing flicker due to vertical subsampling is to employ slightly altered scan rates or offset sync timing to produce a higher (e.g., 4 to 1) interlaced raster on the NTSC receivers This essentially puts lines between the lines in the NTSC display. This technique can be used to increase the vertical resolution of images displayed on existing NTSC receivers, and can be used with subsampled signals as well, as a means of preserving vertical resolution in existing NTSC receivers. A modified NTSC signal capable of increasing the number of scan lines that can be displayed on a conventional NTSC receiver is produced. For many existing NTSC receivers, the signal will increase the number of lines displayed with no receiver modifications required.

In accordance with the present invention, the number of lines is increased by causing the NTSC receiver to use an interlace greater than 2 to 1 in the display. By this method, higher interlace ratios such as 3 to 1, 4 to 1, 5 to 1, etc., can be achieved in an existing receiver without altering the transmitted horizontal and vertical scan frequencies or any of the other signal frequencies identified with the NTSC system. For an advanced NTSC compatible system or an enhanced NTSC system, this method can be used to provide improved vertical resolution in many existing receivers as well as advanced receivers. It can also reduce the apparent line structure in those existing receivers.

For systems utilizing subsampling, flicker caused by vertical detail can be reduced by reproducing in the NTSC display the vertical coordinates corresponding to the original sampling geometry. For systems employing horizontal subsampling, each line may be output more than once per frame. If only the horizontal timing is changed from field to field, vertical sync timing, the phase of the vertical serrations, and the phase of the equalizing pulses should not deviate from their normal NTSC field to field specifications. The field dependent delays of horizontal timing should begin after vertical sync has occurred, and the field dependent delays should be removed before the leading equalizing pulses of the next field. In this manner, the vertical deflection in the NTSC receiver can be synchronized to occur at a steady NTSC rate, with negligible field to field perturbation in vertical timing. In the NTSC receiver, with uniform vertical synchronization, fields that are more delayed will appear lower on the screen.

Figure 15:
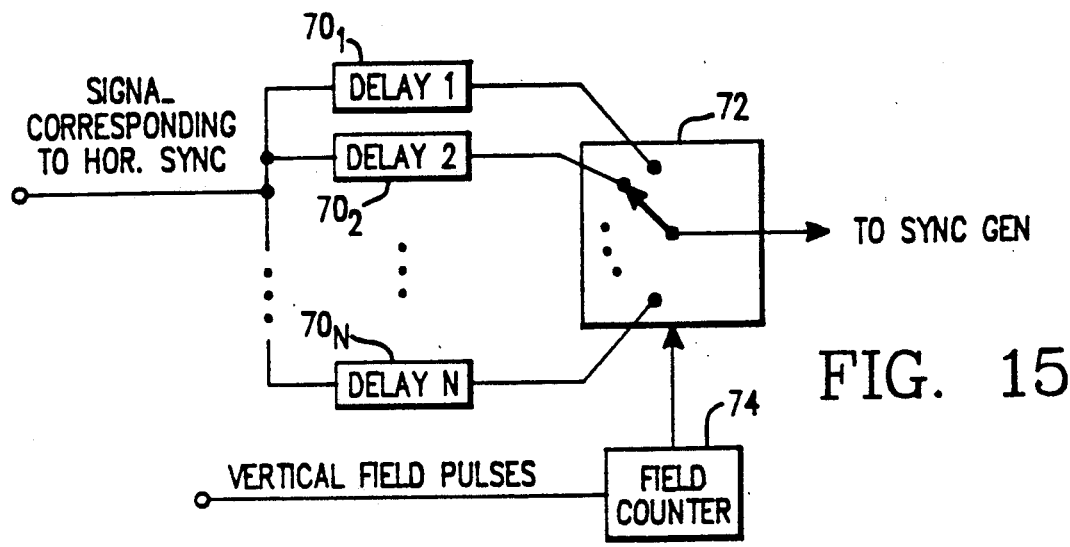
FIG. 15 is a block diagram of a circuit for generating an NTSC sync signal for producing N:1 ; interlacing, where N is an integer greater than 2.

FIG. 15 is a block diagram of a circuit for shifting horizontal pulses in a television sync generator in phase in order to produce an N field (N:1) interlace, where N is an integer greater than 2. A signal corresponding to the horizontal sync signal will be output with a constant phase delay over the entire active picture area in each field. A plurality of delay lines $70_1$ to $70_N$ and a switch 72 provide a horizontal pulse train corresponding to the horizontal sync signal with field dependent offset delay. A field counter 74 receives vertical field pulses and outputs a switching signal which is used to actuate the switch 72 to set the appropriate delay for each field. While different delays are shown for each field, in practice some delays may be equal and some may be zero.

NTSC scanning frequencies produce an intrinsic 2 to 1 interlace. However, it may not be desired to retain any of the field to field horizontal timing characteristics of NTSC. Psychophysical factors may determine that line crawl is less noticeable for some interlace patterns than others. Through properly chosen delays, the interlaced lines may be output in a sequence chosen to minimize the perception of line crawl.

When it is desired to display twice the number of lines normally found in the active picture portion of an NTSC signal, this can be achieved by introducing different timing offsets in the picture area of each of four sequential fields. For 4:1 interlace with equal spacing, these timing offsets would differ by multiples of one-fourth of one line time. A modified sync signal which is produced by the circuit of FIG. 15 may be used to synchronize a television camera adapted to the new interlace pattern, producing the new signal directly.

Figure 16:
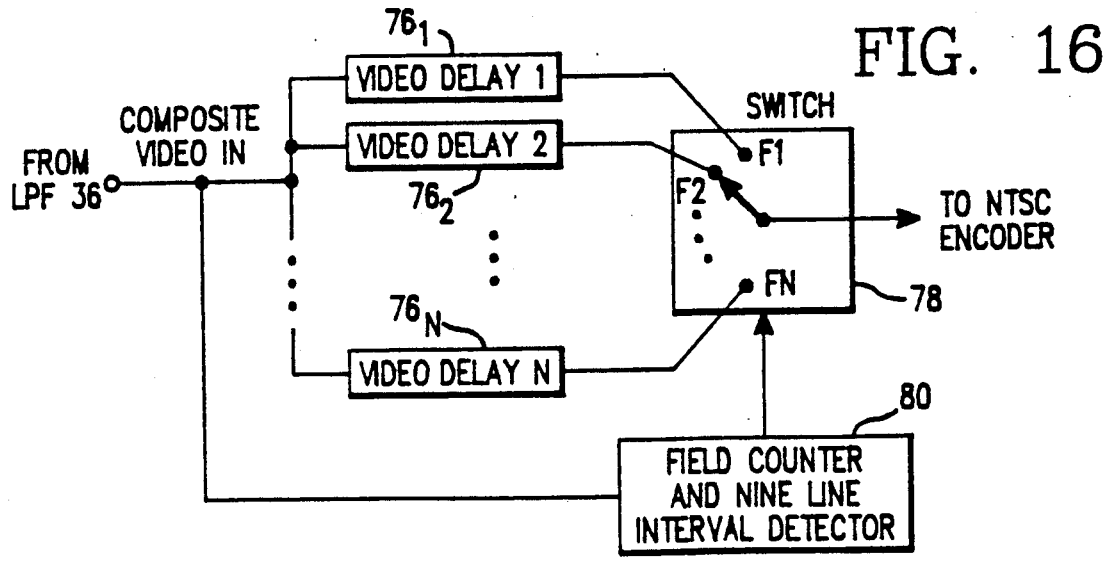
FIG. 16 is a block diagram of an alternate embodiment of a circuit for producing the same result as FIG. 15 when the input is an encoded video signal with conventional sync timing.

FIG. 16 is a block diagram of a circuit for converting a composite NTSC video signal with conventional sync timing into a multiple interlace signal. In this case, the composite video signal which may be the subsampled analog video signal output by the low pass filter 36 of FIG. 3, is delayed in the active picture area by delay lines $76_1$–$76_N$ to delay the active picture area by different amounts from field to field. The outputs of the delay lines $76_1$–$76_N$ are provided to a switch 78 which outputs one of the delayed composite video signals in dependence upon its switching position. The switching position of the switch 78 is controlled by a field counter and nine line interval detector 80, so that a modified NTSC interlace is produced. In an alternate embodiment, the composite video signal is presubsampled in the vertical direction (e.g., by the circuit of FIG. 14), in which case the output signal will cause a conventional NTSC receiver to display the full number of lines, correctly positioned. In another alternate embodiment, the composite video signal is not presubsampled in the vertical direction, in which case a higher number of lines will be displayed but with no increase in resolution.

Figure 17A:
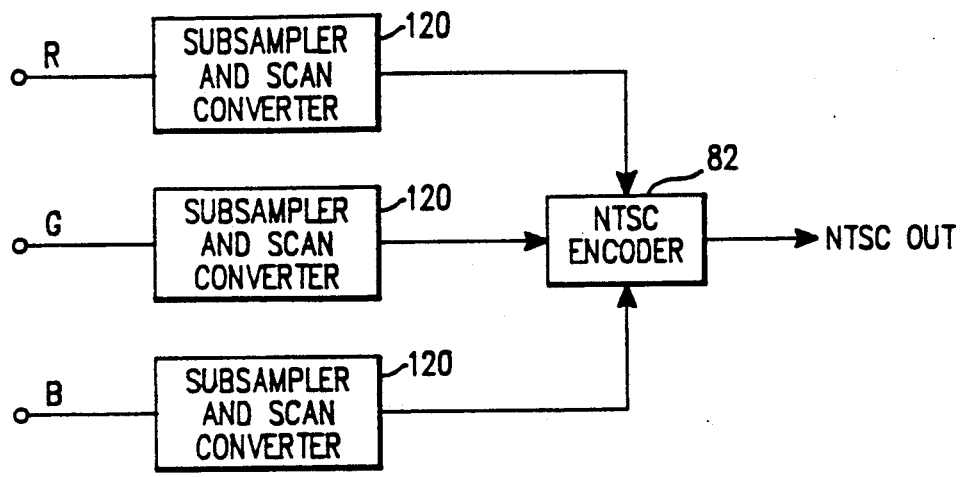
FIGS. 17A and 17B are block diagrams of a system for employing the embodiments of the present invention in a color video transmission system.
Figure 17B:
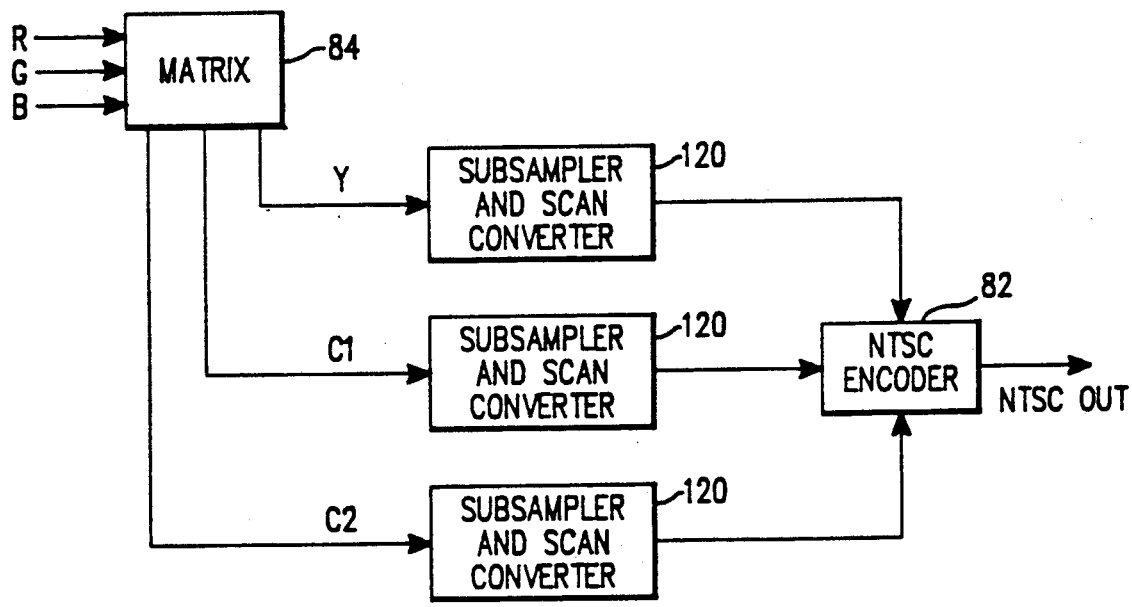

The features of the present invention with respect to improving flicker due to vertical and horizontal subsampling have been described with general reference to a video signal, without specifying the various video signals which are typically included in a standard television signal. However, it should be noted that each of these video signals can be separately processed by the circuit of FIG. 3 and/or the circuits of FIGS. 14 and/or 16. FIGS. 17A and 17B illustrate the use of a subsampler and scan converter 120 with color component video signals. The subsampler and scan converter 120 is formed by the horizontal sampling circuit of FIG. 3, either taken alone or in combination with the vertical subsampling circuit of FIG. 14 or the vertical subsampling circuit of FIG. 16. FIG. 17A illustrates an embodiment in which each of the color signals R, G and B (red, green and blue), are separately processed by the subsampler and scan converter 120 and then provided to an NTSC encoder 82 which produces an NTSC signal output. Alternatively, the color signals R, G and B can be provided to a matrix circuit 84 which produces a luminance signal Y and two color channel signals C1 and C2, each of which is subsampled and scan converted by its individual subsampler and scan converter 120, and the subsampled analog signals are then provided to an NTSC encoder 82 which produces the NTSC signal output. The components can be subsampled at rates chosen in accordance with the bandwidth limitations of encoded NTSC. For example, the color channel signals C1 and C2 can be sampled at rates lower than that used for the luminance signal Y. Further, these rates can be chosen such that color resolution is increased by the same proportion as luminance resolution.

The present invention is also directed to providing circuitry in the advanced or high definition receiver which is capable of reconstructing the high definition video signal from the NTSC compatible subsampled analog signal which is produced by the method and system of the present invention. For this, it is necessary for the advanced receiver to resample the NTSC compatible signal using the correct timing offset for each frame.

Figure 18:
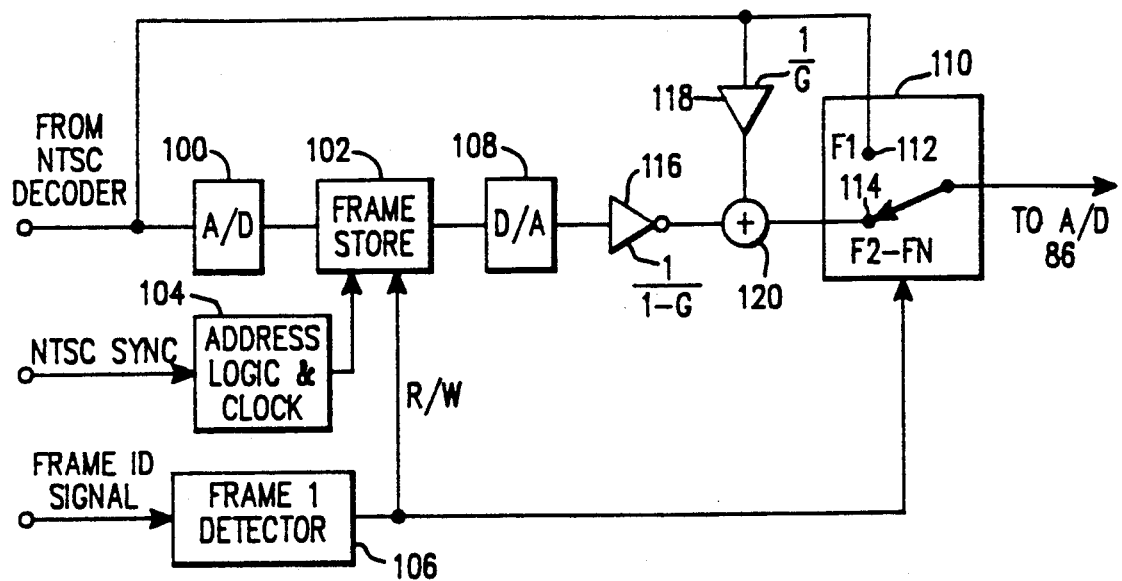
FIG. 18 is a block diagram of a circuit for reconstructing a high definition video signal from a subsampled analog signal which has been produced by the circuit of FIG. 14.
Figure 19:
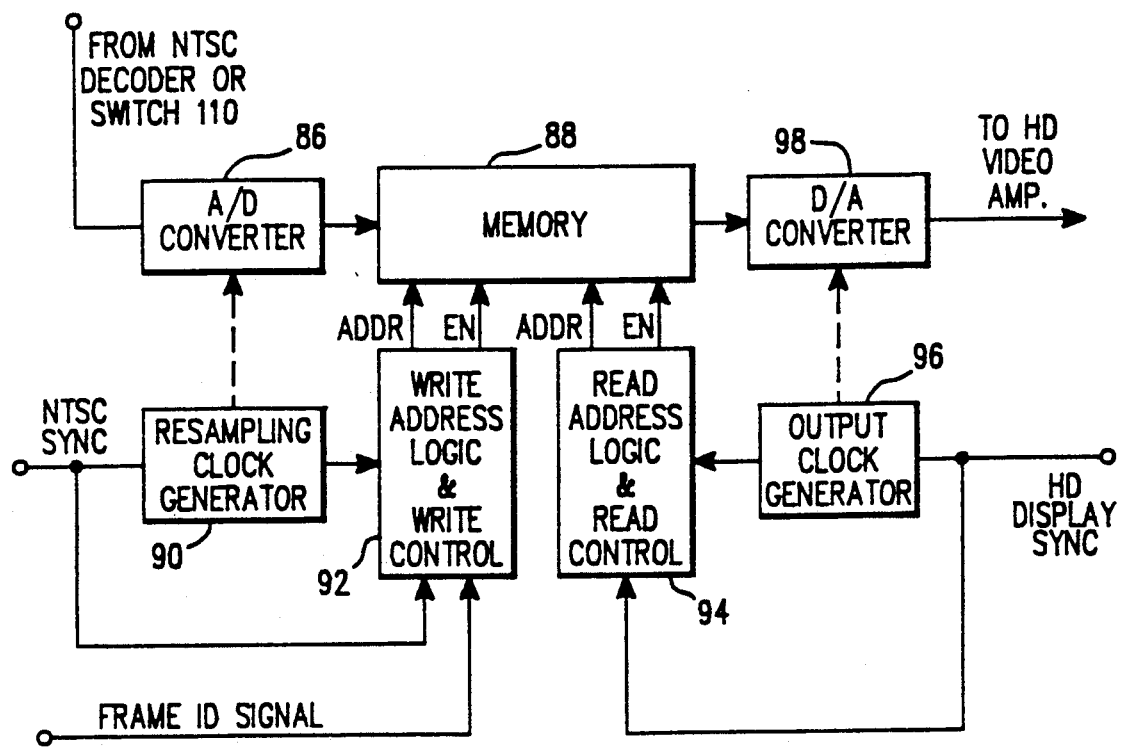
FIG. 19 is a circuit for reconstructing a high definition video signal after it has been subsampled and converted by the circuit of FIG. 3.

FIG. 18 is a block diagram of a circuit which can be inserted in a high definition receiver to reconstruct a high definition video signal which has been altered to minimize flicker caused by subsampling in accordance with the circuit of FIG. 14. An A/D converter 100 receives the subsampled analog signal from a standard NTSC decoder and provides a digital signal to a frame store 102. The NTSC sync signal is provided to an address logic and clock circuit 104 which produces addresses under the control of the NTSC sync signal. The frame ID signal is provided to a frame 1 detector 106 which generates a detection signal and provides it to the frame store 102 as a read/write signal. When frame 1 is detected, the data corresponding to frame 1 is written into the frame store 102 in accordance with the addresses provided by clock circuit 104. When the detection signal indicates that the frame is other than frame 1, the detection signal acts as a read signal to cause the frame 1 data to be read from frame store 102 and provided to a D/A converter 108. The detection signal is also provided to a switch 110. When the detection signal indicates that frame 1 is being processed, the sWitch 110 connects to an output 112 so as to provide the subsampled analog signal directly as an output to the A/D converter 86 of FIG. 19. When a frame other than frame 1 is detected, the switch 110 is connected to an output 114 as indicated in FIG. 19. When the switch is in this position, the analog output provided by the D/A converter 108 is amplified by an inverting amplifier 116 having an amplification factor of $(1/1-G)$ and the subsampled analog signal corresponding to the frame currently being processed is amplified by an amplifier 118 having an amplification factor of $1/G$. Then, the outputs of amplifiers 116 and 118 are added together by an adder 120 and provided to the output 114. Thus, the amplifiers 116 and 118 perform the inverse operation of the attenuators 50 and 64 in FIG. 14.

FIG. 19 is a block diagram of a circuit for use in an advanced receiver for obtaining the original high definition video signal from the transmitted NTSC compatible subsampled analog video signal, when the subsampled analog video signal has been altered by horizontal subsampling in accordance with the circuit of FIG. 3. If frame combining has also taken place, then the circuit of FIG. 19 is coupled to switch 110 of FIG. 18. If frame combining has not been performed, then the circuit of FIG. 19 may be connected directly to a standard NTSC decoder which provides a subsampled analog signal to an A/D converter 86. The A/D converter 86 produces a digital signal for storage in a memory 88 which is an HDTV frame size memory. The NTSC sync signal is provided to a resampling clock generator 90 which provides a clock signal to a write address logic and write control circuit 92. The clock signal triggers the control circuit 92 to provide addresses and enable writing into the specified addresses in the memory 88 which is a refresh memory. The frame ID signal is also provided to the control circuit 92 to identify the NTSC frame, so as to specify a particular portion of memory into which the data is to be written. A read address logic and read control circuit 94 receives a clock signal from an output clock generator 96 which is triggered by a high definition display sync. The clock signal from the output clock generator 96 causes data to be read from the memory 88 to a D/A converter 98, so as to produce a reconstructed high definition video signal which is provided to a high definition video amplifier. The appropriate phase differences are generated by the output clock generator 96 in the manner described above with respect to FIG. 3, or by inserting the circuit of FIG. 4 between the NTSC decoder and the A/D converter 86.

In the pixel splitting/combining method described above with respect to FIGS. 20A-20C and 21, pixel values from different high definition lines are combined for transmission in an NTSC compatible system with reduced flicker. In the advanced television receiver, the complete solution of these transmitted pixels for the original values would require that a process equivalent to the simultaneous solution of N equations be performed in the receiver, where N is equal to or at least close to the number of such pixels occurring in one vertical row from the top of the picture to the bottom. While the exact solution can be achieved in this manner, a method for achieving an approximate solution is described below with respect to FIGS. 22A-22C. By using this method for achieving an approximate solution, less memory is required in the advanced receiver than for the above-described method for obtaining the exact solution, and the propagation of noise disturbance effects vertically throughout the picture is avoided.

Figure 22A:
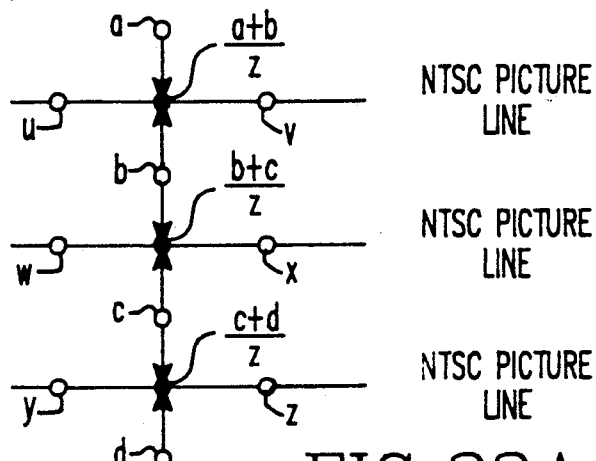
FIGS. 22A, 22B and 22C are diagrams illustrating methods for extracting original pixel values in an advanced receiver, when the pixel splitting/combining technique of FIGS. 20A to 20C has been employed.
Figure 22B:
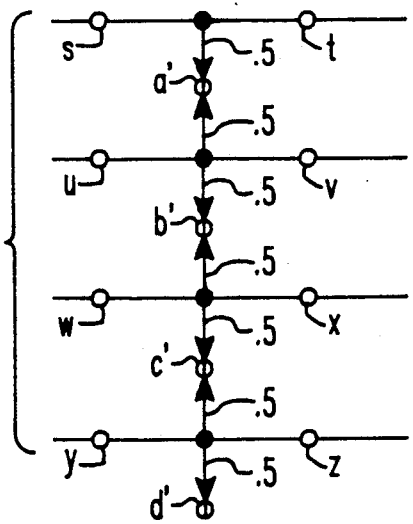

FIG. 22A illustrates a method for deriving pixels which are combined using the method illustrated by FIG. 20A. In FIG. 22A, derived pixels are obtained by using the Equations $(a+b)/2$, $(b+c)/2$ and $(c+d)/2$. FIG. 22B illustrates a method for restoring the original values of the off-line pixels in the advanced receiver. This method is simply the complementary operation of the encoding method of FIG. 22A, whereby pixels are split back into their original locations. Thus, values for the original pixels are obtained by solving the following equations:

$$b' = a/4 + b/2 + c/4$$

$$c' = b/4 + c/2 + d/4$$

However, the values for the high definition pixels obtained in this matter are only approximate, and contain significant components of vertically adjacent pixels.

Figure 22C:
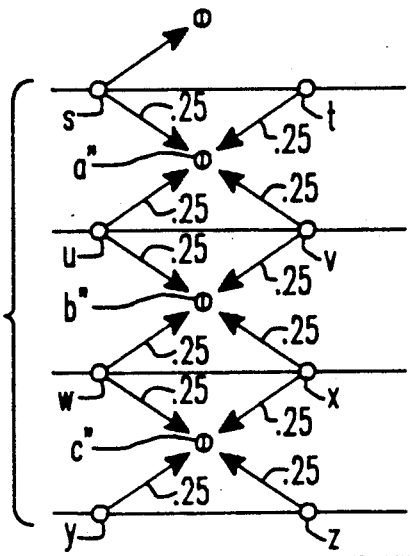

FIG. 22C illustrates the averaging of diagonally adjacent pixels to produce a different approximation for the same arrangement of pixels illustrated in FIG. 22B by using the following equations:

$$a'' = (s+t+u+v)/4$$

$$b'' = (u+v+w+x)/4$$

$$c'' = (w+x+y+z)/4$$

This second approximation actually contains nothing of the original pixel value. However, the two approximations can be combined in a way that reduces the influence of vertically adjacent pixels on the final approximation of the original pixel values, yielding a combined final approximation of, for example, $b''' = 2b' - a''/2 - c''/2$.

The present invention may be implemented in numerous ways. For example, while specific embodiments showing insertion of phase offsets in clock signals have been variously shown as at the write-in or the read-out of a memory, the inverse operation can also be performed. Further, while in the embodiment of FIG. 3, subsampling has been shown as occurring at the input to the memory, subsampling can also be performed by first storing the data and then subsampling the stored data when reading out the memory. Further, while several embodiments of the present invention illustrate the use of delay lines, and suitable type of circuitry for providing the desired shifts in timing may be employed. For example, voltage controlled delays may be employed in place of the delay lines. In addition, the described methods for reducing flicker may be combined to varying degrees on a pixel by pixel basis. For example, while preservation of sampling geometry in the horizontal direction may be dealt with through techniques which control the relative timing of the output signal, the preservation of sampling geometry in the vertical direction through pixel splitting/combining as described above with respect to FIGS. 20A-20C is more complex. In certain systems, it may be determined that the splitting/combining technique for reducing flicker in the vertical direction will not be used. Instead, it might be determined that a combination of the technique for preservation of geometry in the horizontal direction should be combined with the technique for minimizing flicker through the reduction of NTSC frame-to-frame differences. In such a case, the reduction in differences could be applied selectively to only those pixels having a vertical sampling offset, or could be applied to all pixels but to a greater degree for those having a vertical offset. In this manner, a balance between the amount of flicker caused by vertical detail and the amount of flicker caused by horizontal detail could be achieved.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. A method for converting a high definition video signal corresponding to a high definition picture, into a subsampled video signal compatible with NTSC transmission, comprising the steps of:

(a) performing N-phase subsampling on the high definition video signal at a first rate to produce N sets of subsamples, each of the subsamples corresponding to a different geographic position in the high definition picture, where N is an integer greater than 1;

(b) processing the N sets of subsamples during N NTSC video frames, respectively, to generate the subsampled video signal at an NTSC compatible rate which is different from the first rate, the subsampled video signal forming a picture having lines, the N NTSC video frames forming an NTSC picture corresponding to the high definition picture, each of the N sets of subsamples being processed so as to map each subsample onto a geographic position within the NTSC picture corresponding to the geographic position of the subsample in the high definition picture;

(c) selecting alternate ones of the picture lines for mapping into locations in an NTSC picture frame having corresponding locations; and (d) combining pairs of the unselected picture lines during the succeeding NTSC frame by combining for each of the selected picture lines selected in said step (c), the picture lines above and below the selected picture line, and mapping the combined picture lines int o locations in the succeeding NTSC picture frame at line positions for the corresponding selected picture line.

2. A method according to claim 1, wherein said step (b) comprises the substeps of:

(b1) storing the N sets of subsamples; and (b2) reading out the N sets of subsamples during the N NTSC video frames, respectively, each of the N sets of subsamples being read out at a timing which preserves the geographic positions of the subsamples within the NTSC picture formed by the N NTSC video frames.

3. A method according to claim 2, wherein said substep (b2) comprises clocking out the N sets of subsamples at the NTSC compatible rate which is different from the first rate, wherein the start of said clocking out of each of the N sets of subsamples is offset from the start of the clocking out of the preceding set of subsamples.

4. A method according to claim 3, wherein one of the N sets of subsamples is a reference set of subsamples, and wherein said step (b) further comprises the substeps of:

(b3) storing the reference set of subsamples clocked out during one of the N NTSC video frames;

(b4) providing the reference set of subsamples corresponding to the reference N NTSC video frame as a portion of the subsampled video signal; and (b5) sequentially combining the remaining N−1 sets of subsamples with the stored reference set of subsamples of the reference NTSC video frame to provide the remaining portions of the subsampled video signal.

5. A system for converting a high definition video signal corresponding to a high definition picture, into a subsampled video signal compatible with NTSC transmission, comprising:

means for performing N-phase subsampling on the high definition video signal at a first rate to produce N sets of subsamples, each of the subsamples corresponding to a different geographic position in the high definition picture, where N is an integer greater than 1;

means for processing the N sets of subsamples during N NTSC video frames, respectively, to generate the subsampled video signal at an NTSC compatible rate which is different from the first rate, the subsampled video signal forming a picture having lines, the N NTSC video frames forming an NTSC picture corresponding to the high definition picture, each of the N sets of subsamples being processed so as to map each subsample onto a geographic position within the NTSC picture corresponding to the geographic position of the subsample in the high definition picture;

means for selecting alternate ones of the picture lines for mapping into locations in an NTSC picture frame having corresponding locations; and means for combining pairs of the unselected picture lines during the succeeding NTSC frame by combing for each of the selected picture lines, the picture lines above and below the selected picture line, and mapping the combined picture lines into locations in the succeeding NTSC picture frame at line positions for the corresponding selected picture line.

6. The system according to claim 5, wherein said means for processing the N sets of subsamples comprises:

means for storing the N sets of subsamples; and means for reading out the N sets of subsamples during the N NTSC video frames, respectively, each of the N sets of subsamples being read out at a timing which preserves the geographic positions of the subsamples within the NTSC picture formed by the N NTSC video frames.

7. The system according to claim 6, wherein said reading means comprises means for clocking out the N sets of subsamples at the NTSC compatible rate which is different from the first rate, wherein the start of said clocking out of each of the sets of subsamples is offset from the clocking out of the preceding set of subsamples.

8. The system according to claim 5, wherein said system is coupled to receive a high definition sync signal and an NTSC sync signal, and wherein said means for performing N-phase subsampling comprises:

a sampling clock coupled to receive the high definition sync signal, for producing a sampling clock signal at the first rate; and an A/D converter, coupled to said sampling clock generator coupled to receive the high definition video signal, for generating a subsampled digital signal.

9. The system according to claim 8, wherein said means for processing the N sets of subsamples comprises:

a write address logic and write control circuit, coupled to said sampling clock generator, for providing a write address;

a memory coupled to said A/D converter and to said write address logic and write control circuit, for storing the subsampled digital signal under the control of said write address logic and write control circuit;

an output clock generator, for receiving the NTSC sync signal and for generating an output clock signal at the NTSC compatible rate, wherein the output clock signal for successive NTSC video frames is offset by a predetermined amount;

a read address logic and read control circuit, coupled to said output clock generator and said memory, for providing a read address to said memory in dependence upon the output clock signal, so that the start of the read out of each of the n sets of subsamples is offset from one another, so as to map each of the subsamples onto a geographic position within the NTSC picture corresponding to the geographic position of the subsample in the high definition picture.

10. A system according to claim 9, wherein one of the N sets of subsamples is a reference set of subsamples, and wherein said means for processing for the N sets of subsamples further comprises:
means, coupled to said memory, for providing the reference set of subsamples in the reference NTSC video frame as a portion of the subsampled video signal;
means, coupled to said memory, for storing the reference set of subsamples int he reference NTSC video frame; and
means for sequentially combining the remaining N−1 sets of subsamples with the reference set of subsamples of the reference NTSC video frame to provide the remaining portions of the subsampled video signal.

11. A circuit for generating an NTSC compatible sync signal for producing N:1 interlocking, where N is an integer greater than two, comprising.
means for providing a signal corresponding to a horizontal sync signal;
a plurality of delay lines coupled to receive the signal corresponding to the horizontal sync signal;
a switch coupled to said plurality of delay lines, for selectively connecting to one of said plurality of delay lines to provide a delayed signal corresponding to the horizontal sync signal, as an output; and
means for receiving a signal representative of a number of vertical fields, and for providing a switching signal to cause said switch to connect the appropriate one of said delay lines.

12. A method for converting a high definition video signal corresponding to a high definition picture, into a subsampled video signal compatible with NTSC transmission, comprising the steps of:
(a) performing N-phase subsampling on the high definition video signal to produce N sets of subsamples, each of the subsamples corresponding to a different geographic position in the high definition picture, where N is an integer greater than 1 and wherein one of the N sets of subsamples is a reference set of subsamples;
(b) processing the N sets of subsamples during N NTSC video frames, respectively, to generate the subsampled video signal, the N NTSC video frames forming an NTSC picture corresponding to the high definition picture, said step (b) comprising the substeps of:
(b1) storing the reference set of subsamples processed during one of the N NTSC video frames;
(b2) providing the reference set of subsamples corresponding to the reference NTSC video frame as a portion of the subsampled video signal; and
(b3) sequentially combining the remaining N−1 sets of subsamples with the stored reference set of subsamples of the reference NTSC video frame to provide the remaining portions of the subsampled video signal, said substep (b3) comprising, for each of the remaining N−1 sets of subsamples, substeps of:
attenuating the stored reference set of subsamples of the reference NTSC video frame by a predetermined first attenuation factor;
attenuating the Ith set of subsamples by a predetermined second attenuation factor, where I is an integer greater than 1 and less than or equal to N; and
adding the attenuated stored reference set of subsamples and the attenuated Ith set of subsamples and providing the result as one of the remaining portions of the subsampled video signal.

13. A system for converting a high definition video signal corresponding to a high definition picture, into a subsampled video signal compatible with NTSC transmission, comprising:
means for performing N-phase subsampling the high definition video signal to produce N sets of subsamples, each of the subsamples corresponding to a different geographic position in the high definition picture, where N is an integer greater than 1 and wherein one of the N sets of subsamples in a reference set of subsamples; and
means for processing the N sets of subsamples during N NTSC video frames, respectively, to generate the subsampled video signal, the N NTSC video frames forming an NTSC picture corresponding to the high definition picture, said processing means including:
means for reading out the reference set of subsamples in the reference NTSC video frame to provide a portion of the subsampled video signal, said means for reading out the reference set of said subsamples in the reference NTSC video frame comprising a switch having a first position in which the reference set of subsamples is provided as an output, said switch also having a second position;
means for storing the reference set of subsamples in the reference NTSC video frame; and
means for sequentially combining the remaining N−1 sets of subsamples with the reference set of subsamples of the reference NTSC video frame to provide the remaining portions of the subsampled video signal, said sequential combining means comprising:
a first attenuator, having a first attenuation factor and coupled to said storing means, for providing first attenuated values;
a second attenuator, having a second attentuation factor and coupled to receive the remaining N−1 sets of subsamples sequentially, each of the remaining N−1 sets of subsamples being output as second attentuated values; and
an adder coupled to said first and second attenuators and to said switch, for adding the first and second sets of attenuated values and for providing the added output to said switch, said switch outputting the added values as the remaining portions of the subsampled video signal when said switch is in the second position.

14. A circuit for generating an NTSC compatible sync signal for producing N:1 interlacing, where N is an integer greater than 2, comprising:
means for providing a signal corresponding to a horizontal sync signal;
means for receiving a signal representative of a number of vertical fields, and for providing a control signal corresponding to the number of vertical fields; and
means for generating a selected one of a plurality of modified horizontal sync signals corresponding to the horizontal sync signal, the selected one of the plurality of modified sync signals being selected based on the control signal.

* * * * *